(12) United States Patent
Jiang et al.

(10) Patent No.: US 12,461,032 B2
(45) Date of Patent: Nov. 4, 2025

(54) LIGHT ENERGY FLUORESCENCE EXCITATION

(71) Applicant: Illumina, Inc., San Diego, CA (US)

(72) Inventors: Rui Jiang, San Diego, CA (US); Joseph Pinto, Solana Beach, CA (US)

(73) Assignee: ILLUMINA, INC., San Diego, CA (US)

( * ) Notice: Subject to any disclaimer, the term of this patent is extended or adjusted under 35 U.S.C. 154(b) by 168 days.

(21) Appl. No.: 18/496,681

(22) Filed: Oct. 27, 2023

(65) Prior Publication Data

US 2024/0060895 A1 Feb. 22, 2024

Related U.S. Application Data

(63) Continuation of application No. 16/206,574, filed on Nov. 30, 2018, now abandoned.
(Continued)

(30) Foreign Application Priority Data

Mar. 20, 2018 (NL) ...................................... 2020636

(51) Int. Cl.
| G01N 21/64 | (2006.01) |
| C12Q 1/6869 | (2018.01) |
| G01J 3/10 | (2006.01) |
| G02B 27/09 | (2006.01) |
| H10F 39/00 | (2025.01) |

(52) U.S. Cl.
CPC ....... *G01N 21/6428* (2013.01); *C12Q 1/6869* (2013.01); *G01J 3/10* (2013.01); *G01N 21/6452* (2013.01); *G01N 21/6456* (2013.01); *G02B 27/0994* (2013.01); *G01N 2021/6419* (2013.01); *G01N 2021/6439* (2013.01); *G01N 2021/6463* (2013.01); *G01N 2201/0638* (2013.01); *G01N 2201/08* (2013.01); *G01N 2201/0806* (2013.01); *H10F 39/8037* (2025.01);
(Continued)

(58) Field of Classification Search
None
See application file for complete search history.

(56) References Cited

U.S. PATENT DOCUMENTS 5,680,209 A 10/1997 Machler
6,441,973 B1 8/2002 Ramm et al.
(Continued)

FOREIGN PATENT DOCUMENTS

CN 101470075 A 7/2009
CN 101571479 A 11/2009
(Continued)

OTHER PUBLICATIONS

List of Patent and/or Patent Applications treated as related for U.S. Appl. No. 18/496,681, filed Oct. 27, 2023 dated Jan. 19, 2024.
(Continued)

*Primary Examiner* — Xiaoyun R Xu
(74) *Attorney, Agent, or Firm* — Heslin Rothenberg Farley & Mesiti P.C.

(57) ABSTRACT

There is set forth herein a light energy exciter that can include one or more light sources. A light energy exciter can emit excitation light directed toward a detector surface that can support biological or chemical samples.

11 Claims, 14 Drawing Sheets

Related U.S. Application Data

(60) Provisional application No. 62/644,805, filed on Mar. 19, 2018, provisional application No. 62/611,448, filed on Dec. 28, 2017.

(52) U.S. Cl.
CPC ........ *H10F 39/8057* (2025.01); *H10F 39/806* (2025.01); *H10F 39/811* (2025.01)

(56) References Cited

U.S. PATENT DOCUMENTS

| | | |
|---|---|---|
| 6,496,309 B1 | 12/2002 | Bliton et al. |
| 6,654,119 B1 | 11/2003 | Gould et al. |
| 6,867,851 B2 | 3/2005 | Blumenfeld et al. |
| 8,906,320 B1 | 12/2014 | Eltoukhy et al. |
| 2007/0145498 A1 | 6/2007 | Metz et al. |
| 2011/0168918 A1 | 7/2011 | Wimberger-Friedl et al. |
| 2012/0014837 A1 | 1/2012 | Fehr et al. |
| 2012/0019828 A1 | 1/2012 | McCaffrey et al. |
| 2012/0021525 A1 | 1/2012 | Fehr et al. |
| 2012/0099308 A1 | 4/2012 | Brukilacchio |
| 2013/0079232 A1* | 3/2013 | Kain ............... C12Q 1/6869 435/6.1 |
| 2013/0258700 A1 | 10/2013 | Schuch et al. |
| 2014/0131578 A1 | 5/2014 | Hruska et al. |
| 2015/0079596 A1 | 3/2015 | Eltoukhy et al. |
| 2016/0061740 A1 | 3/2016 | Grot et al. |
| 2016/0230210 A1 | 8/2016 | Mingsong et al. |
| 2016/0356715 A1 | 12/2016 | Zhong et al. |
| 2017/0058343 A1 | 3/2017 | Quintel et al. |
| 2019/0204227 A1 | 7/2019 | Jiang et al. |

FOREIGN PATENT DOCUMENTS

| | | |
|---|---|---|
| CN | 105980832 A | 9/2016 |
| CN | 209570503 U | 11/2019 |
| JP | 2003515107 A | 4/2003 |
| JP | 2013092393 A | 5/2013 |
| RU | 2494375 | 9/2013 |
| WO | WO1994004892 | 3/1994 |
| WO | WO2014017067 A1 | 1/2014 |
| WO | WO2015089092 A1 | 6/2015 |
| WO | WO2016168996 A1 | 10/2016 |
| WO | WO2017037535 A2 | 3/2017 |
| WO | WO2019133183 A1 | 7/2019 |

OTHER PUBLICATIONS

Decision to grant a European patent, mailed on Oct. 26, 2023, 3 page.

Office Action mailed in corresponding action JP2019571271 on May 18, 2021.

Office Action mailed in corresponding action CN109975256 on Apr. 13, 2021 (cited with copy of original document and full text translation).

Search Report/Expert Report filed in corresponding action CL2019003782 on Feb. 15, 2021.

Alexa, How Do Light Pipes Work ?; retrieved from the Internet: https://jayconsystems.com/blog/alea-how-do-lightpipes-work: Feb. 9, 2021; 8 pages.

Edmund Optics, Light Pipes homogenize nonuniform light sources; retrieved from the Internet: https://web.archive.org/web/20100823120804/https://news.thomanet.com/fullstory/light-pipes-homogenize-npn-uniform-light-sources-523659/; Jul. 10, 2007; 5 pages.

Notice of Eligibility of Grant; Intellectual Property Office of Singapore; Reference No. 2023/00007681PF11V; Mailing Date Jan. 16, 2023; 1 page.

Examination Report; Intellectual Property Office of Singapore; Application No. 112019115865; Dated Jan. 13, 2023; 5 pages.

* cited by examiner

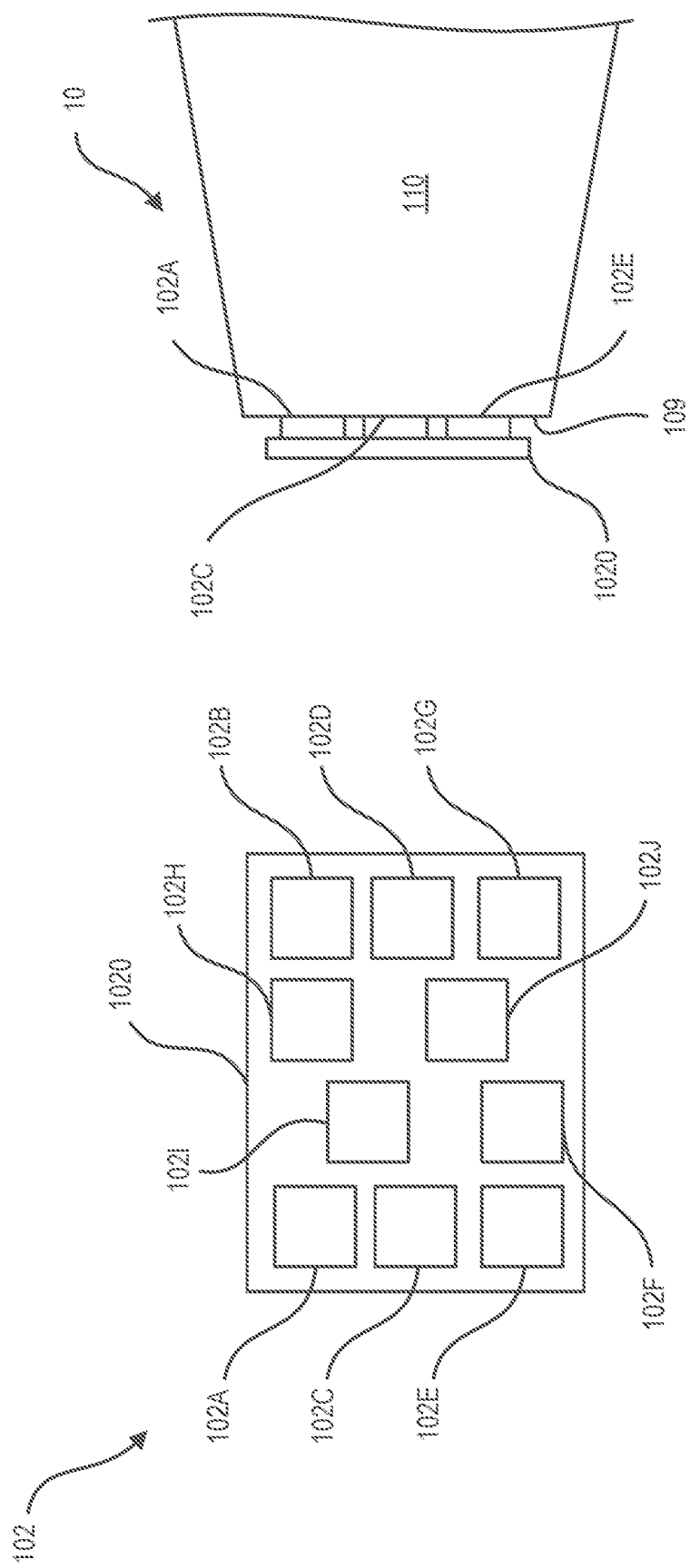

LIGHT ENERGY FLUORESCENCE EXCITATION

CROSS-REFERENCE TO RELATED APPLICATIONS

This application is a continuation of U.S. patent application Ser. No. 16/206,574, filed Nov. 30, 2018, entitled, "LIGHT ENERGY FLUORESCENCE EXCITATION," which is incorporated herein by reference in its entirety, which U.S. patent application Ser. No. 16/206,574 claims priority to U.S. Patent Application No. 62/611,448, filed Dec. 28, 2017, entitled, "LIGHT ENERGY FLUORESCENCE EXCITATION," which is incorporated herein by reference in its entirety, which U.S. patent application Ser. No. 16/206,574 also claims priority to U.S. Patent Application No. 62/644,805, filed Mar. 19, 2018, entitled, "LIGHT ENERGY FLUORESCENCE EXCITATION," which is incorporated herein by reference in its entirety, which U.S. patent application Ser. No. 16/206,574 also claims priority to Dutch Patent Application No. 2020636, filed Mar. 20, 2018, entitled, "LIGHT ENERGY FLUORESCENCE EXCITATION," which is incorporated herein by reference in its entirety.

BACKGROUND

Various protocols in biological or chemical research involve performing controlled reactions. The designated reactions can then be observed or detected and subsequent analysis can help identify or reveal properties of chemicals involved in the reaction.

In some multiplex assays, an unknown analyte having an identifiable label (e.g., fluorescent label) can be exposed to thousands of known probes under controlled conditions. Each known probe can be deposited into a corresponding well of a microplate. Observing any chemical reactions that occur between the known probes and the unknown analyte within the wells can help identify or reveal properties of the analyte. Other examples of such protocols include known DNA sequencing processes, such as sequencing-by-synthesis (SBS) or cyclic-array sequencing.

In some fluorescent-detection protocols, an optical system is used to direct excitation light onto fluorophores, e.g. fluorescently-labeled analytes and to also detect the fluorescent emissions signal light that can emit from the analytes having attached fluorophores. However, such optical systems can be relatively expensive and require a larger benchtop footprint. For example, the optical system can include an arrangement of lenses, filters, and light sources.

In other proposed detection systems, the controlled reactions in a flow cell define by a solid-state light sensor array (e.g. a complementary metal oxide semiconductor (CMOS) detector or a charge coupled device (CCD) detector). These systems do not involve a large optical assembly to detect the fluorescent emissions.

BRIEF DESCRIPTION

There is set forth herein a light energy exciter that can include one or more light sources. A light energy exciter can emit excitation light directed toward a detector surface that can support biological or chemical samples.

There is set forth herein a method comprising: emitting with a light energy exciter excitation light, wherein the light energy exciter comprises a first light source and a second light source, the first light source to emit excitation light rays in a first wavelength emission band, the second light source to emit excitation light rays in a second wavelength emission band; and receiving with a detector the excitation light and emissions signal light resulting from excitation by the excitation light, the detector comprising a detector surface for supporting biological or chemical samples and a sensor array spaced apart from the detector surface, the detector blocking the excitation light and permitting the emissions signal light to propagate toward light sensors of the sensor array; and transmitting with circuitry of the detector data signals in dependence on photons sensed by the light sensors of the sensor array.

There is set forth herein a light energy exciter comprising: at least one light source to emit excitation light rays; and a light pipe homogenizing the excitation light and directing the excitation light toward a distal end of the light energy exciter, the light pipe comprising a light entrance surface and a light exit surface, the light pipe receiving the excitation light rays from the at least one light source; wherein the distal end of the light energy exciter is adapted for coupling with a detector assembly that comprises a detector surface for supporting biological or chemical samples.

There is set forth herein a system comprising: a light energy exciter comprising at least one light source to emit excitation light rays, and a light pipe to homogenize the excitation light rays and to direct the excitation light rays, the light pipe comprising a light entrance surface to receive the excitation light rays from the at least one light source; and a detector comprising a detector surface for supporting biological or chemical samples and a sensor array comprising light sensors spaced apart from the detector surface, wherein the detector receives excitation light from the exciter and emissions signal light, wherein the detector comprises circuitry to transmit data signals in dependence on photons detected by light sensors of the sensor array, wherein the detector blocks the excitation light and permits the emissions signal light to propagate toward the light sensors.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DRAWINGS

These and other features, aspects, and advantages set forth herein will become better understood when the following detailed description is read with reference to the accompanying drawings in which like characters represent like parts throughout the drawings, wherein:

FIG. 4 depicts a light source bank including light sources provided by a plurality of LEDs disposed on a printed circuit board according to one example;

FIG. 5 is a side view of light sources provided by a plurality of LEDs surface coupled onto a light entry surface of a light pipe according to one example;

Figure 18:
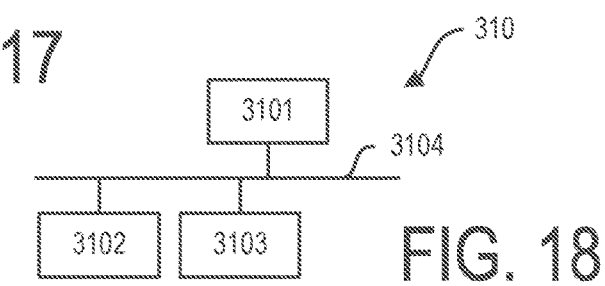
Figure 19:
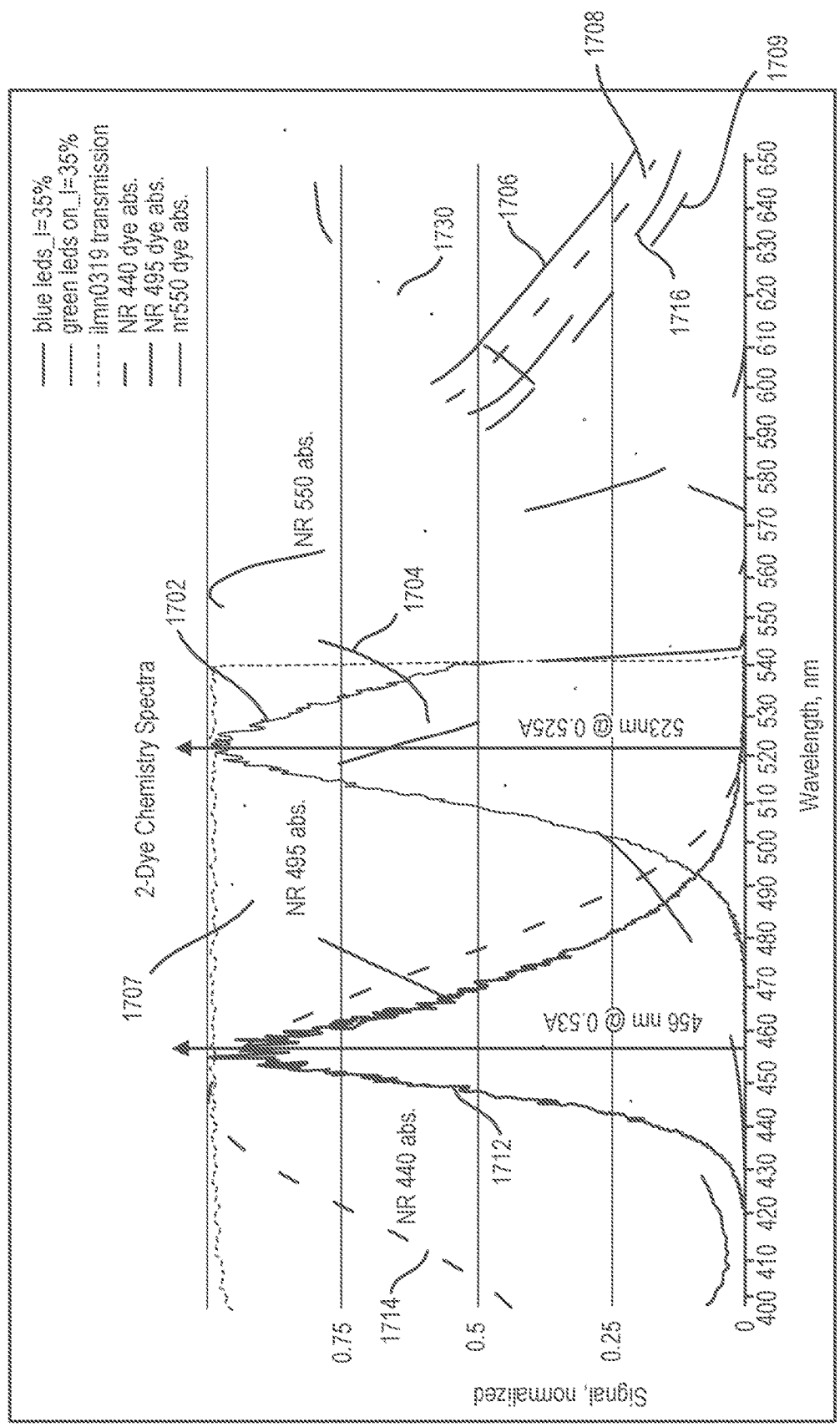
Figure 20:
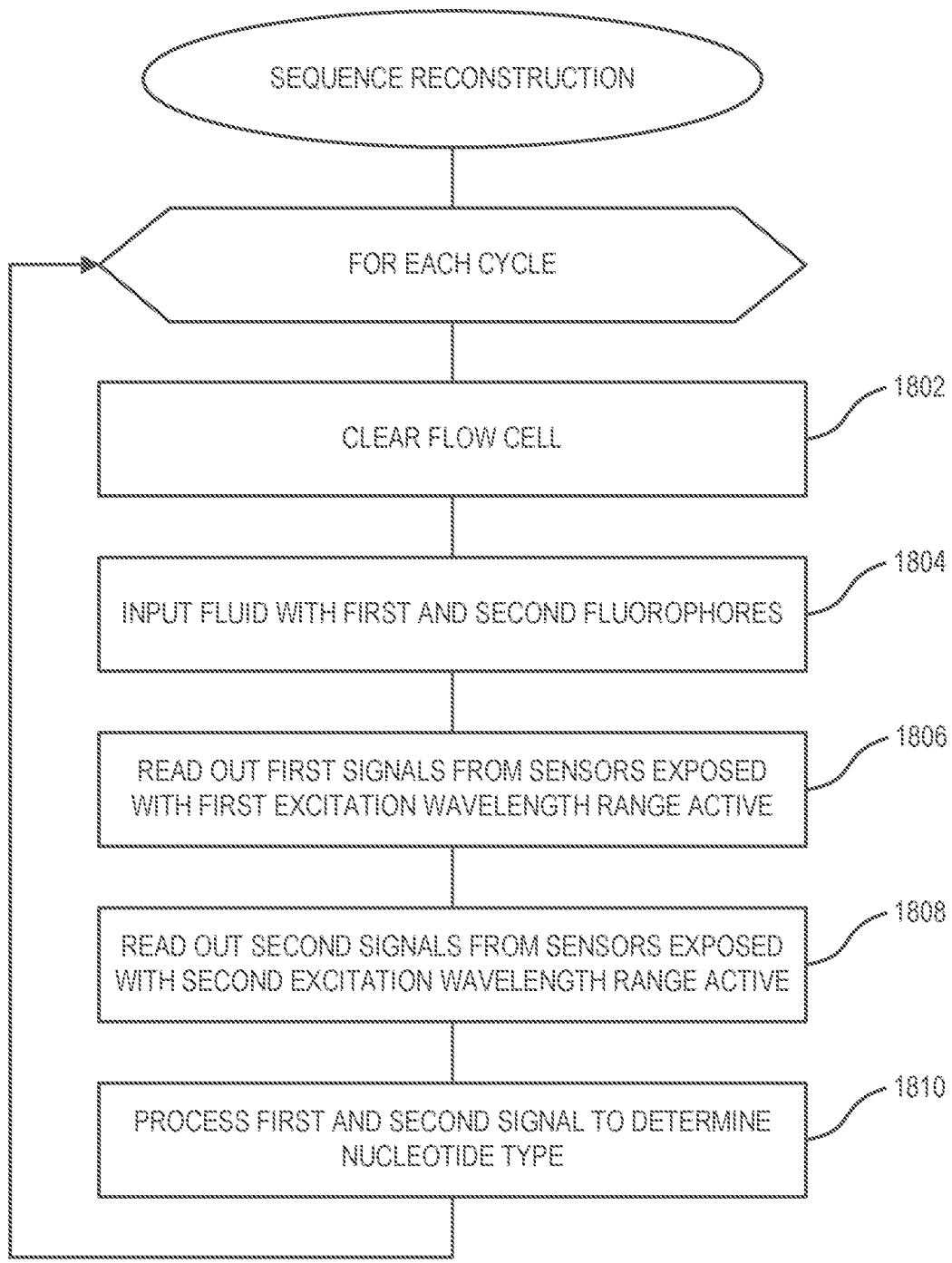

FIG. 18 is a schematic diagram of a process control system according to one example, FIG. 19 is a spectral profile coordination diagram depicting spectral profiles of a plurality of light energy exciter light sources and a plurality of fluorophores that may be excited with use of the excitation light sources; and FIG. 20 is a flowchart depicting process that can be used in support of a DNA sequencing process for DNA sequence reconstruction.

DETAILED DESCRIPTION

Figure 1:
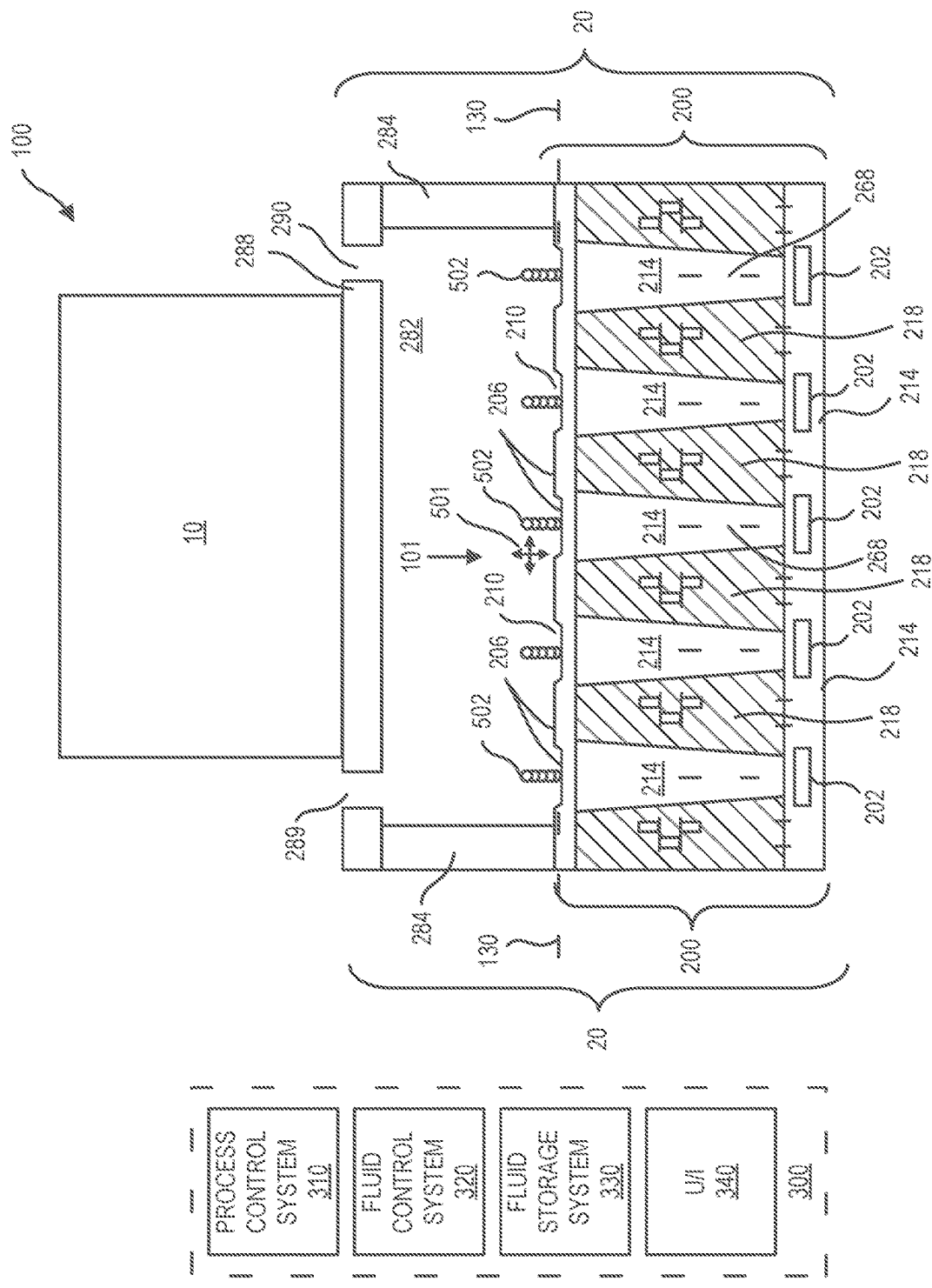
FIG. 1 is a schematic block diagram of a system for performance of biological or chemical tests, the system having a light energy exciter and a detector assembly having a detector according to one example.

In FIG. 1 there is set forth a light energy exciter 10 for use in a system 100. System 100 can be used to perform biological or chemical tests. System 100 can include light energy exciter 10 and detector assembly 20. Detector assembly 20 can include detector 200 and flow cell 282. Detector 200 can include a plurality of light sensors 202 and detector surface 206 for supporting samples 502 e.g. analytes which can be provided by DNA fragments. Detector surface 206 according to one example can define a plurality of reaction recesses 210 and samples 502 such as biological or chemical samples can be supported within such reaction recesses 210.

Detector 200 can include a plurality of light guides 214 that receive excitation light and emissions signal light from detector surface 206 resulting from excitation by the excitation light. The light guides 214 can guide light from detector surface 206. The light guides 214 extend toward respective light sensors 102 and can include filter material that blocks the excitation light and permits the emissions signal light to propagate toward the respective light sensors.

According to one example, detector 200 can be provided by a solid-state integrated circuit detector such as a complementary metal oxide semiconductor (CMOS) integrated circuit detector or a charge coupled device (CCD) integrated circuit detector.

According to one example, each light sensor 202 can be aligned to a respective light guide 214 and a respective reaction recess 210 so that longitudinal axis 268 extends through a cross sectional geometric center of a light sensor 202, light guide 214 and reaction recess 210. Flow cell 282 can be defined by detector surface 206, sidewalls 284, and flow cover 288. Flow cover 288 can be a light transmissive cover to transmit excitation light provided by light energy exciter 10.

In another aspect, detector 200 can include dielectric stack areas 218, intermediate of the light guides 214. Dielectric stack areas 218 can have formed therein circuitry, e.g. for read out of signals from light sensors 202 digitization storage and processing.

System 100 can include inlet portal 289 through which fluid can enter flow cell 282 and outlet portal 290 through which fluid can exit flow cell 282. Inlet portal 289 and outlet portal 290 can be defined by flow cover 288.

According to one example, system 100 can be used for performance of biological or chemical testing with use of fluorophores. For example, a fluid having one or more fluorophore can be caused to flow into and out of flow cell 282 through inlet port using inlet portal 289 and outlet portal 290. Fluorophores can attract to various samples 502 and thus, by their detection fluorophores can act as markers for the samples 502 e.g. biological or chemical analytes to which they attract.

To detect the presence of a fluorophore within flow cell 282, light energy exciter 10 can be energized so that excitation light 101 in an excitation wavelength range is emitted by light energy exciter 10. On receipt of excitation light fluorophores attached to samples 502 can radiate emissions signal light 501 which is the signal of interest for detection by light sensors 202. Emissions signal light 501 owing to fluorescence of a fluorophore attached to a sample 502 will have a wavelength range red shifted relative to a wavelength range of excitation light 101.

Light energy exciter 10 can be activated to emit excitation light 101 to excite fluorophores that have attached to samples 502. On being excited by excitation light 101 fluorophores attached to samples 5102 can fluoresce to radiate emissions signal light 501 at a wavelength range having longer wavelengths than a wavelength range of excitation light 101. The presence or absence of emissions signal light 501 can indicate a characteristic of a sample 502. Light guides 214 according to one example can filter light in the wavelength range of excitation light 101 transmitted by light energy exciter 10 so that light sensors 202 do not detect excitation light 101 as emissions signal light 501.

System 100 in test support systems area 300 can include process control system 310, fluid control system 320, fluid storage system 330, and user interface 340 which permits an operator to enter inputs for control of system 100. Process control system 310 according to one example can be provided by processor based system. Process control system 310 can run various biological or chemical processes such as DNA sequence reconstruction processes. According to one example, for running of a biological or chemical process, process control system 310 can send coordinated control signals e.g. to light energy exciter 10, detector 200 and/or fluid control system 320. Fluid storage system 330 can store fluids that flow through flow cell 282.

According to one example, light energy exciter 10 can include one or more light sources. According to one example, light energy exciter 10 can include one or more light shaping element. Light energy exciter 10 can include one or more optical component for shaping light emissions directing light emitted from the one or more light sources. The one or more light sources can include, e.g. one or more light pipe, lens, wedge, prism, reflector, filter, grating, collimator, or any combination of the above.

Figure 2:
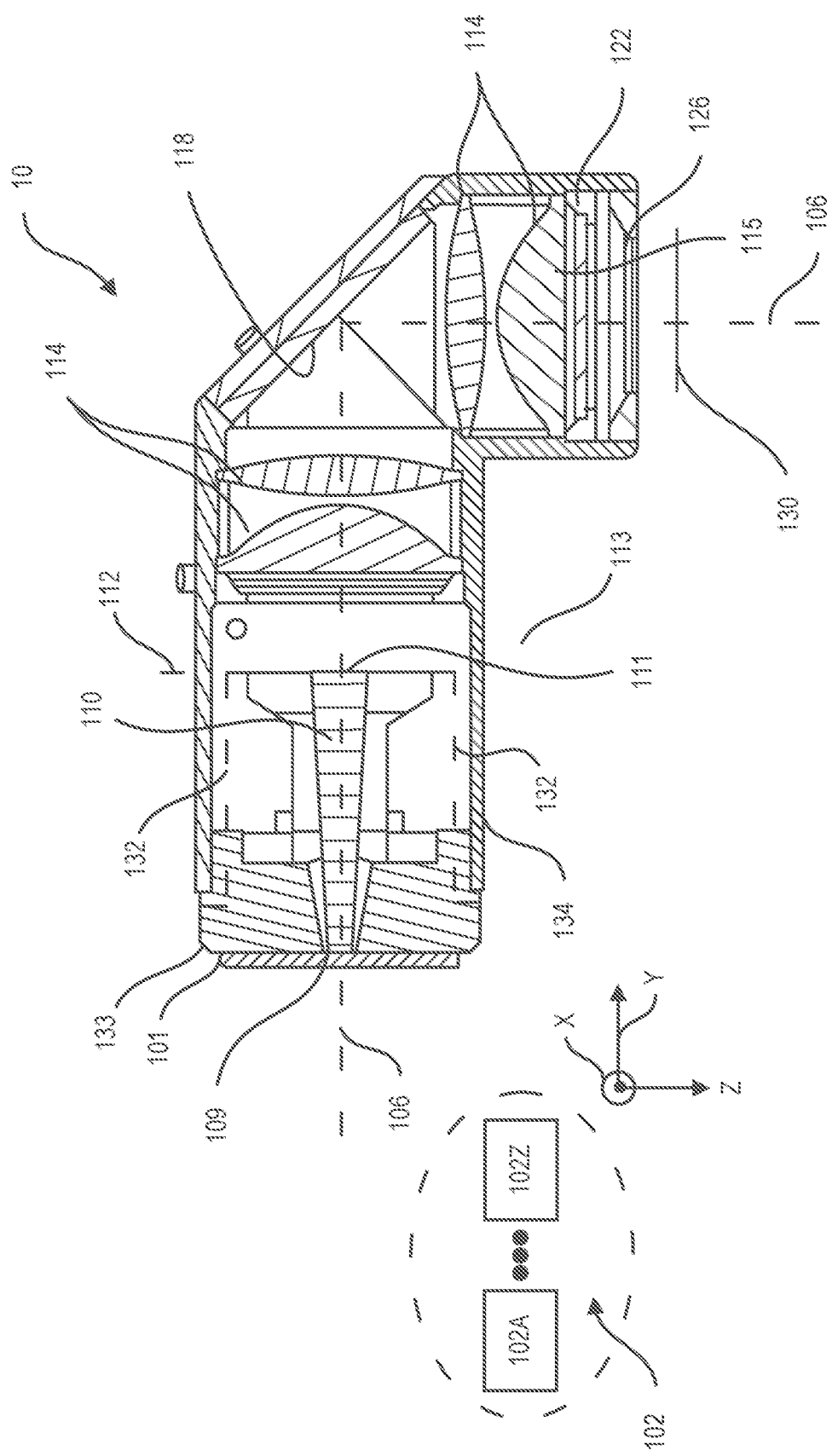
FIG. 2 is a cutaway side view of a light energy exciter according to one example.

FIG. 2 illustrates a light energy exciter 10 according to one example. Light energy exciter 10 can include a light source bank 102 having one or more light sources, e.g. light source 102A-102Z and various optical elements for directing light along optical axis 106, which in the example shown is a folded axis.

Light energy exciter 10 can include light pipe 110 and lens 114 for shaping excitation light rays transmitted through light pipe 110. Light pipe 110 and lens 114 can have cross sectional geometric centers centered on optical axis 106.

Light pipe 110 can include light entry surface 109 and light exit surface 111. Excitation light 101 emitted from light source bank 102 can enter light entry surface 109 and can exit light exit surface 111 of light pipe 110. Light pipe 110 by having an index of refraction selected for providing internal reflections can reflect received light rays received from light source bank 102 in various directions to homogenize light so that exit light rays transmitted through light pipe 110 are homogenous. Thus, even where a light source of light source bank 102 may have "hot spots" or is asymmetrically disposed with respect to light pipe 110 or have other irregularities, homogenous light can be produced at the light exit surface 111 of light pipe 110.

Light pipe 110 by having an index of refraction selected for providing internal reflections can confine excitation light rays that it receives and transmits to the volumetric area delimited by sidewall surfaces defining light pipe 110. Light pipe 110 can be formed of homogenous light transmissive material, e.g. polycarbonate or silica glass.

According to one example, light pipe 110 can be of tapered construction defined by an increasing diameter throughout its length in a direction from the light entry surface 109 to the light exit surface 111 of light pipe 110. According to one example, light pipe 110 can be of tapered construction defined by a linearly increasing diameter throughout its length in a direction from the light entry surface 109 to the light exit surface 111 of light pipe 110.

According to one example, light energy exciter 10 can be configured so that lens 114 images light exit surface 111 of light pipe 110 onto image plane 130 and according to one example system 100 can be configured so that image plane 130 coincides with detector surface 206 which can be configured to support a sample 502 such as a DNA fragment. Lens 114 by imaging an object plane onto an image plane can project an image of homogenized light present at light exit surface 111 of light pipe 110 onto sample supporting detector surface 206 of detector 200 (FIG. 1).

Examples herein recognize that while light source bank 102 can be selected so that excitation light rays emitted from light source bank 102 do not include fluorescence range light rays, fluorescence range light rays can nevertheless radiate within light energy exciter 10 as a result of autofluorescence. In another aspect, light energy exciter 10 can include a short pass filter 122 to filter fluorescence range wavelengths radiating as a result of autofluorescence from within light energy exciter 10, e.g. radiating from lens 114, light pipe 110, and reflector 118 as well as other surfaces of light energy exciter 10.

Light energy exciter 10 can include light reflector 118 for folding optical axis 106 so that optical axis 106 changes direction from a first direction in which optical axis 106 extends parallel to the reference Y axis shown to a second direction in which optical axis 106 extends parallel to the reference Z axis shown. Light energy exciter 10 can include window 126 having a cross sectional center centered on optical axis 106 as well as housing 134 and other supporting components for supporting the various optical components in certain spatial relation such as the certain spatial relation depicted in FIG. 1.

Figure 3:
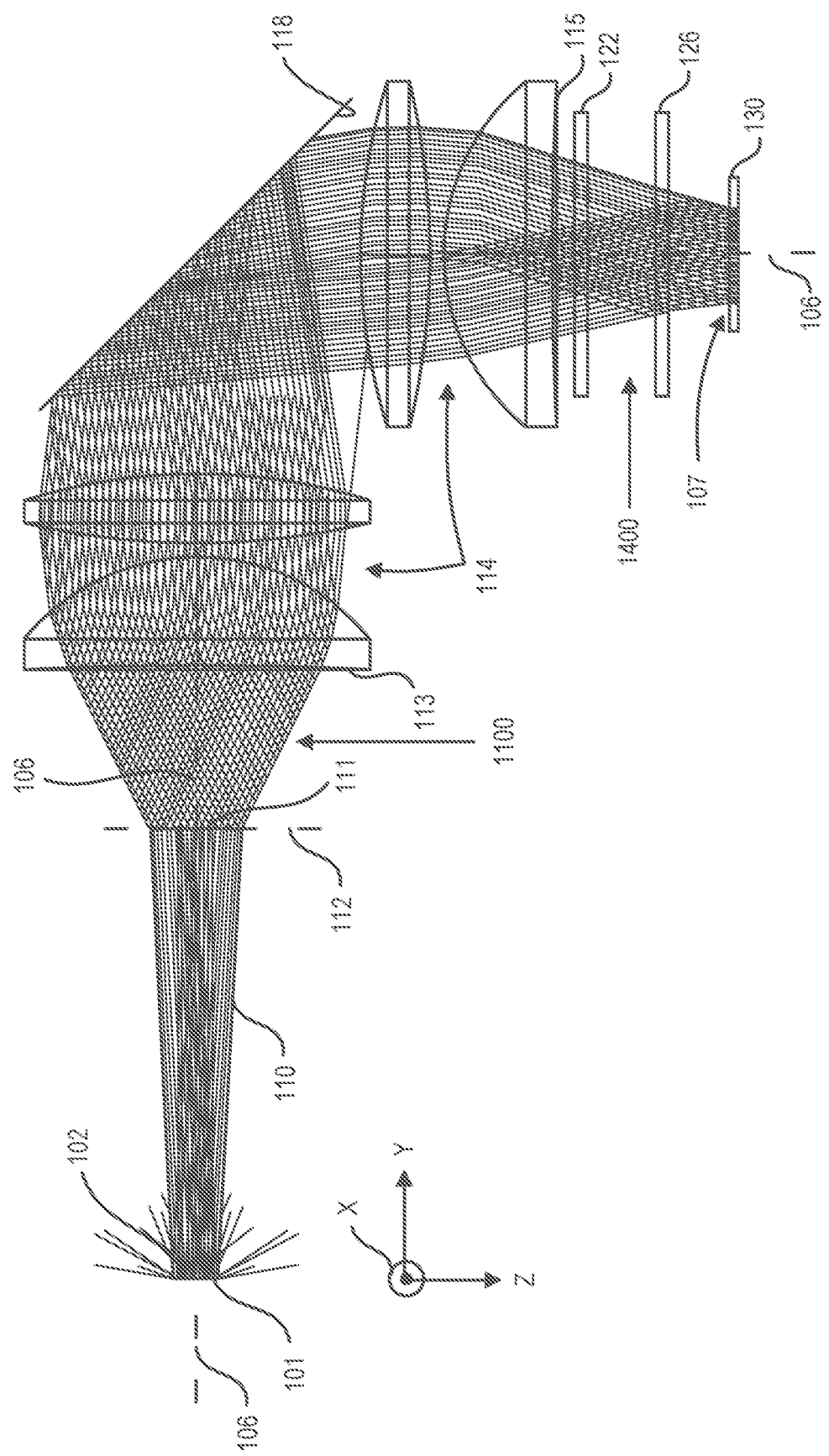
FIG. 3 is a ray trace diagram illustrating light ray propagation in the light energy exciter of FIG. 2 according to one example.

A ray trace diagram for light energy exciter 10 in the example of FIG. 2 is shown in FIG. 3. Referring to the ray trace diagram of FIG. 3, lens 114 can image an object plane 112 which can be defined at the light exit surface 111 of light pipe 110 onto an image plane 130 which can be located at detector surface 206 that can be adapted to support biological or chemical samples. As seen from the ray trace diagram of FIG. 3, light rays exiting light exit surface 111 of light pipe 110 can be diverging light rays that diverge at a divergence angle that is sufficiently restricted so that a majority of light rays exiting light exit surface 111 of light pipe 110 are received by light entry surface of lens 114. Examples herein recognize that while light pipes are useful for purposes of homogenizing light, they are capable of transmitting exit light rays that exit at large maximum divergence angles, e.g. approaching 90°.

Examples herein recognize for example that in the case that light pipe 110 is constructed alternatively to have a uniform diameter, i.e. a non-tapered diameter, a substantial percentage of exit light rays exiting light pipe 110 may exit light exit surface 111 at a divergence angle that is sufficiently large that a light entry surface 113 of lens 114 may not collect the exit light rays. Examples herein recognize that providing light pipe 110 to be of tapered construction, tapered along its length and having a geometric cross sectional center centered on optical axis 106 and including an appropriate index of refraction provides reflections within light pipe 110 so that light exiting light rays exiting light exit surface 111 of light pipe 110 exit light exit surface 111 of light pipe 110 at an angle that is reduced relative to a 90° angle of maximum divergence.

In the example described in reference to FIGS. 2 and 3, exit light rays exiting light exit surface 111 of light pipe 110 can define a diverging cone of light 1100 having light rays that diverge at angles ranging from zero degrees to a maximum divergence angle in respect to a reference light ray extending from the light exit surface in a direction parallel to optical axis 106. The defined diverging cone of light 1100 can diverge at the maximum divergence angle with respect to optical axis 106. According to one example, the maximum divergence angle is a divergence angle designed so that the majority of exit light rays exiting light exit surface 111 are collected by a light entry surface of lens 114. According to one example, the light energy exciter 10 is configured so that light excitation light rays exiting exit surface 111 diverge at a maximum divergence angle respect to a reference light ray extending from the light exit surface in a direction parallel to optical axis 106 that is sufficiently small so as to ensure collection by light entry surface 113 of lens 114.

According to one example, light energy exciter 10 can be configured so that exit light rays exiting light exit surface 111 of light pipe 110 define a diverging cone of light 1100 having light rays that diverge at angles ranging from zero degrees to a maximum divergence angle in respect to a reference light ray extending from the light exit surface in a direction parallel to optical axis 106, wherein the light pipe 110 is configured so that the maximum divergence angle is about 60 degrees or less. According to one example, light energy exciter 10 is configured so that exit light rays exiting light exit surface 111 of light pipe 110 define a diverging cone of light 1100 having light rays that diverge at angles ranging from zero degrees to a maximum divergence angle in respect to a reference light ray extending from the light exit surface in a direction parallel to optical axis 106, wherein the light pipe 110 is configured so that the maximum divergence angle is about 50 degrees or less. According to one example, light energy exciter 10 is configured so that exit light rays exiting light exit surface 111 of light pipe 110 define a diverging cone of light 1100 having light rays that diverge at angles ranging from zero degrees to a maximum divergence angle in respect to a reference light ray extending from the light exit surface in a direction parallel to optical axis 106, wherein the light pipe 110 is configured so that the maximum divergence angle is about 40 degrees or less. According to one example, light energy exciter 10 is configured so that exit light rays exiting light exit surface 111 of light pipe 110 define a diverging cone of light 1100 having light rays that diverge at angles ranging from zero degrees to a maximum divergence angle in respect to a reference light ray extending from the light exit surface in a direction parallel to optical axis 106, wherein the light pipe 110 is configured so that the maximum divergence angle is about 35 degrees or less. According to one example, light energy exciter 10 is configured so that exit light rays exiting light exit surface 111 of light pipe 110 define a diverging cone of light 1100 having light rays that diverge at angles ranging from zero degrees to a maximum divergence angle in respect to a reference light ray extending from the light exit surface in a direction parallel to optical axis 106, wherein the light pipe 110 is configured so that the maximum divergence angle is about 30 degrees or less.

For providing imaging functionality, lens 114 can converge received excitation light rays transmitted through light pipe 110. In the example described in reference to FIGS. 2 and 3, exit light rays exiting light exit surface 115 of lens 114 can define a converging cone of light 1400 having light rays that converge at angles ranging from zero degrees to a maximum convergence angle in respect to a reference light ray extending from the light exit surface in a direction parallel to optical axis 106, wherein the lens 114 is configured so that the maximum convergence angle is about 60 degrees or less. The defined converging cone of light 1400 can converge at the maximum convergence angle with respect to optical axis 106. In the example described in reference to FIGS. 2 and 3, exit light rays exiting light exit surface 115 of lens 114 can define a converging cone of light 1400 having light rays that converge at angles ranging from zero degrees to a maximum convergence angle in respect to a reference light ray extending from the light exit surface in a direction parallel to optical axis 106, wherein the lens 114 is configured so that the maximum convergence angle is about 50 degrees or less. In the example described in reference to FIGS. 2 and 3, exit light rays exiting light exit surface 115 of lens 114 can define a converging cone of light 1400 having light rays that converge at angles ranging from zero degrees to a maximum convergence angle in respect to a reference light ray extending from the light exit surface in a direction parallel to optical axis 106, wherein the lens 114 is configured so that the maximum convergence angle is about 40 degrees or less. In the example described in reference to FIGS. 2 and 3, exit light rays exiting light exit surface 115 of lens 114 can define a converging cone of light 1400 having light rays that converge at angles ranging from zero degrees to a maximum convergence angle in respect to a reference light ray extending from the light exit surface in a direction parallel to optical axis 106, wherein the lens 114 is configured so that the maximum convergence angle is about 35 degrees or less. In the example described in reference to FIGS. 2 and 3, exit light rays exiting light exit surface 115 of lens 114 can define a converging cone of light 1400 having light rays that converge at angles ranging from zero degrees to a maximum convergence angle in respect to a reference light ray extending from the light exit surface in a direction parallel to optical axis 106, wherein the lens 114 is configured so that the maximum convergence angle is about 30 degrees or less.

FIG. 4 illustrates light source bank 102 according to one example. Light source bank 102 can include one or more light sources. According to one example, one or more light sources can be provided by one or more electroluminescence based light sources, e.g. a light emitting diode, a light emitting electrochemical cell, an electroluminescent wire, or a laser, or any combination of the above. In the example described in FIG. 4, light source bank 102 can include a plurality of light sources 102A-102J provided by a plurality of light emitting diodes (LEDs). Light sources 102A-102G in the example described can be green LEDs emitting excitation light rays in the green wavelength band and light sources 102H-102J can be blue LEDs emitting excitation light rays in the blue wavelength band. Light sources 102A-102J provided by LEDs can be disposed on printed circuit board 1020 according to one example. In operation of system 100, process control system 310 can control energization of light sources 102A-102J provided by LEDs so that one or more LEDs of a certain emission band is selectively activated at a certain time. Light sources 102A-102J according to one example can be provided by surface emitting LEDs. LEDs such as surface emitting LEDs can have emissions patterns that correlate ray angles with light intensity. LED emissions patterns can be a function of such parameters as a die geometry, a die window, indices of and refraction of light shaping materials. Emissions patterns can be Lambertian according to one example i.e. specifying that intensity is proportional to the cosine of the emission angle relative to the normal.

Process control system 310 for example can energize only light sources 102A-102G provided by green LEDs during a first exposure period of detector 200 in which light sensors 202 are exposed and can energize only light sources 102H-102J provided by blue LEDs during a second exposure period of detector 200 in which light sensors 202 are exposed. Providing light source bank 102 to emit at two independently selectable peak wavelengths facilities a dye chemistry process that can use both green (532 nm) and blue (470 nm) excitation. According to one example, light source bank 102 can include a light source e.g. a red LED disposed on printed circuit board 1020 that emits at a red band center wavelength (e.g. red: 630 nm). Providing red illumination facilitates additional test and calibration procedures according to one example.

It is seen in reference to FIG. 4 that light sources defining light source bank 102 need not be arranged symmetrically uniformly or according to any ordered configuration. For example, it is seen that according to the particular configuration shown in FIG. 4, wherein light sources 102A-102G provided by green LEDs are selectively energized with light sources 102H-102J provided by blue LEDs maintained in a deenergized state, a larger percentage of excitation light rays will enter light pipe 110 through a left side of light entry surface 109 of light pipe 110, and when light sources 102H-102J provided by blue LEDs are selectively energized with green LEDs maintained in a deenergized state, a larger percentage of excitation light rays will enter light pipe through a right side of light entry surface 109 of light pipe 110. Notwithstanding, light pipe 110 by its light reflective properties homogenizes the imbalanced incoming received light to produce homogenized light at the light exit surface 111 of light pipe 110 irrespective of the arrangement of light sources of light source bank 102. The refractive index of light pipe 110 can be chosen such that the light rays from light source bank 102 exhibit total internal reflection (TIR) within light pipe 110 such that at light exit surface 111 of light pipe 110, homogeneous (uniform) illumination is achieved.

As shown in FIG. 5, light source bank 102 can be coupled to light pipe 110 in a manner to assure reduced light loss. In the arrangement depicted in FIG. 5, there is a side view of the LEDs shown as being disposed on printed circuit board 1020 in FIG. 4. In the side view depicted in FIG. 5, light sources 102A, 102C, and 102E provided by LEDs are shown to correspond to light sources 102A, 102C, and 102E, as depicted in FIG. 4. Light sources 102A-102J can be provided by LEDs having flat planar light emission faces depicted as depicted in in FIG. 5. Referring to FIG. 5 the flat planar light emission faces of light sources 102A-102J provided by LEDs (of which light sources 102A, 102C, and 102E are shown in the side view) are surface coupled (butt coupled) onto light entry surface 109 of light pipe 110. Light entry surface 109 like the emission surfaces of light sources 102A-102J provided by LEDs, can be flat and planar to assure low light loss when light sources 102A-102J provided by LEDs are surface coupled onto light entry surface 109. With use of the surface coupling depicted in FIG. 5, coupling efficiency specifying the efficiency of LED light transmission through light pipe 110 of 90 percent or greater can be achieved, and according to one example 98 percent or higher, which compares favorably to coupling efficiency of light sources into a lens where coupling efficiency is in dependence on the numerical aperture of the lens.

Further in reference to FIG. 5, it is seen that an entirety of the front face of each respective light source 102A-102J provided by LEDs is opposed by light entry surface 109 of light pipe 110, thus assuring that a majority of excitation light rays emitted by light sources 102A-102J provided by LEDs are received by light entry surface 109 of light pipe 110.

Light energy exciter 10 can emit excitation light 101 (FIG. 1) at a first lower wavelength range, e.g. below about 560 nm to excite fluorophores which, in response to the excitation light fluoresce to radiate emissions signal light 501 second wavelength range having longer wavelengths, e.g. including wavelengths longer than about 560 nm. Detector 200 can be configured so that these wavelength range emissions at longer wavelengths are detected by light sensors 202. Detector 200 can include light guides 214 that can be formed of filtering material to block light in the wavelength range of excitation light 101 so that that emissions signal light 501 attributable to fluorescing fluorophores is selectively received by light sensors 202.

Examples herein recognize that if light energy exciter 10 emits light in a fluorescence emission band (fluorescence range) such emitted light can be undesirably be sensed as emissions signal light by light sensors 202. Examples herein include features to reduce the emission of fluorescence range wavelengths by light energy exciter 10.

As noted, light energy exciter 10 can include short pass filter 122. Short pass filter 122 permits transmission of excitation light rays in the emission energy band of light source bank 102 but which blocks light at a fluorescence range within flow cell 282 attributable to autofluorescing components within light energy exciter 110. Short pass filter 122 can be disposed at a distal end of light energy exciter 10 so that-short pass filter 122 can reject autofluorescence range wavelengths attributable to autofluorescing materials within light energy exciter 10. To facilitate filtering of autofluorescence range radiation radiating from lens 112 and from components disposed before lens 114 in the direction of light propagation short pass filter 122 can be disposed after lens 114 in a light propagation direction at a distal end of light energy exciter 10. Short pass filter 122 according to one example can include a substrate having deposited thereon alternating layers of materials having higher and lower indices of refraction. Higher index of refraction material can include e.g. titanium dioxide ($TiO_2$) or tantalum pentoxide ($Ta_2O_5$) and lower index of refraction material can include e.g. silicon dioxide ($SiO_2$). Material layers can be hard coated e.g. using ion beam sputtering, according to one example.

To further reduce fluorescence range light, materials of light energy exciter 10 can be selected for reduced autofluorescence. Examples herein recognize that silicate glass autofluoresces less than polycarbonate materials commonly used in optical systems. According to one example one or more optical components of light energy exciter 10 can be selected to be formed of silicate glass. Examples herein recognize that silicate glass can produce reduced autofluorescence relative to an alternative material for optical components and accordingly in accordance with one example one or more of light pipe 110, lens 114, short pass filter 122 (substrate thereof), and window 126 can be selected to be formed of silicate glass for reduction of autofluorescence. According to one example one or more of light pipe 110, lens 114, short pass filter 122 (substrate thereof), and window 126 is selected to be formed of homogeneous silicate glass for reduction of autofluorescence. According to one example each of light pipe 110, lens 114, short pass filter 122 (substrate thereof), and window 126 is selected to be formed of homogeneous silicate glass for reduction of autofluorescence.

Figure 6:
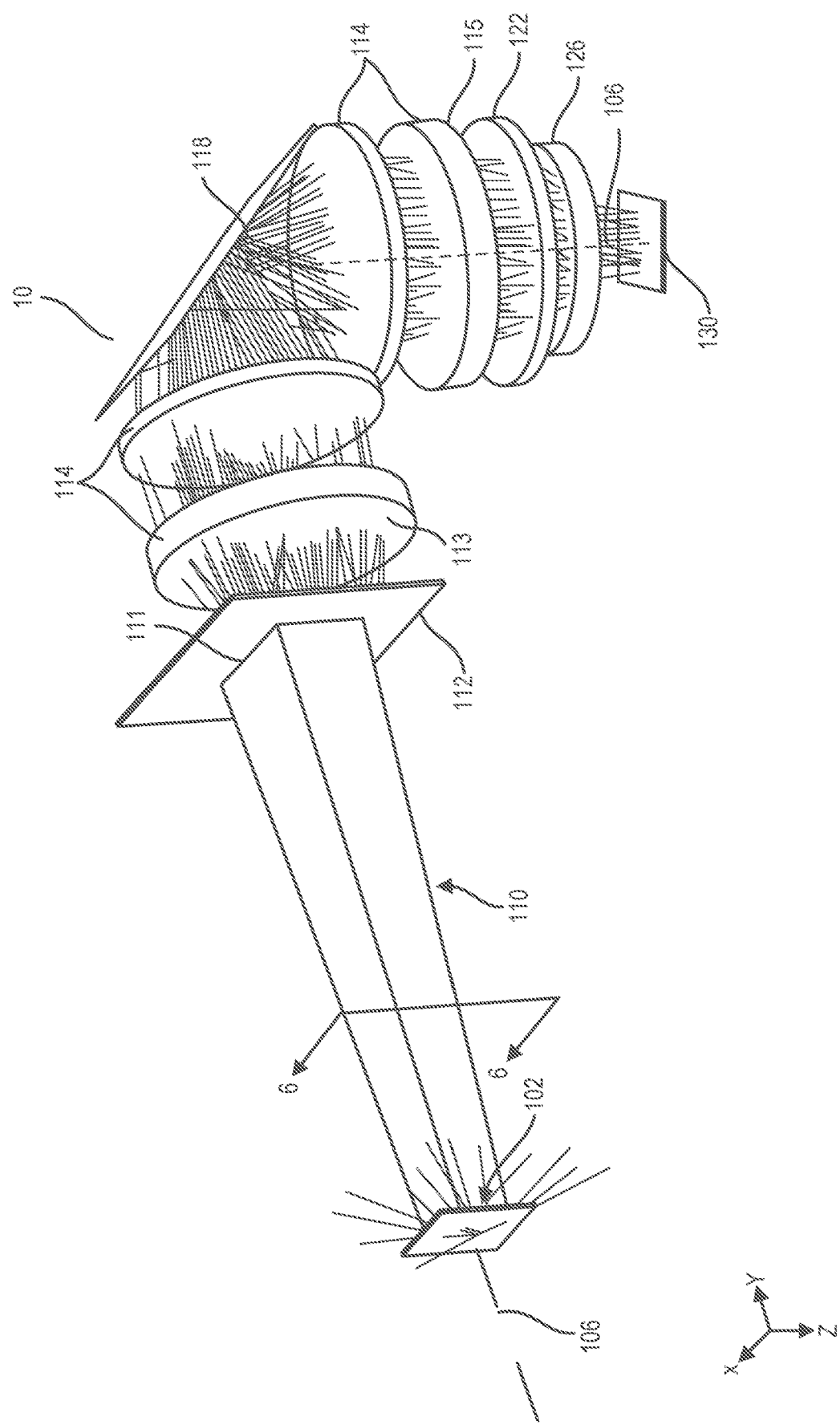
FIG. 6 is a perspective schematic view of a light energy exciter according to one example.

In FIG. 6 a three-dimensional schematic diagram of light energy exciter 10 is shown. As shown in FIG. 6, object plane 112 can be imaged by lens 114 onto image plane 130. As set forth herein, object plane 112 can be defined at light exit surface 111 of light pipe 110, so that the image of the light at light exit surface 111 is projected onto image plane 130, which as noted can be located at detector surface 206 (FIG. 1) of detector 200 for supporting a sample. It will be understood that because lens 114 can image the light exit surface 111 of light pipe 110, the shape of the light exit surface 111 can be imaged onto and according projected onto image plane 130. According to one example, the shape of light exit surface 111 is selected to correspond to the shape and size of detector surface 206, and light energy exciter 110 is configured to image the shape of light exit surface 111 onto image plane 130 so that lens 114 projects an illumination pattern 107 (FIG. 3) onto detector surface 206 that matches a shape and size of detector surface 206.

Configuring light energy exciter 10 to project a light pattern 107 (FIG. 3) onto detector surface 206 that matches a shape and size of detector surface 206 provides various advantages. By such configuring the projected illumination pattern does not illuminate areas outside of a perimeter of detector 200 which is wasteful of light energy and also does not under-illuminate areas that are areas of interest.

In the example described with reference to FIG. 6, both light exit surface 111 and detector surface 206 for supporting a sample can be rectilinear in shape. As seen in FIG. 6, light pipe 110 can include a rectilinear cross section (taken along 6-6 transverse to optical axis 106) throughout its length. Further, as noted, light pipe 110 can be of tapered construction and can have an increasing diameter throughout its length from light entry surface 109 to light exit surface 111 thereof. Where light pipe 110 has a rectilinear cross section, it will be understood that diverging cone of light 1100 defined by excitation light rays exiting light exit surface 111 of light pipe 110 can have a rectilinear cross section with corners becoming softer and more diffuse in the direction of light propagation toward light entry surface 113 of lens 114.

According to one example, light energy exciter 10 can be configured so that light pipe 110 has a rectilinear light exit surface 111, an image of which can be projected by lens 114 onto detector surface 206 for supporting a sample which can have a rectilinear shaped perimeter corresponding to a shape of light exit surface 111.

Figure 7:
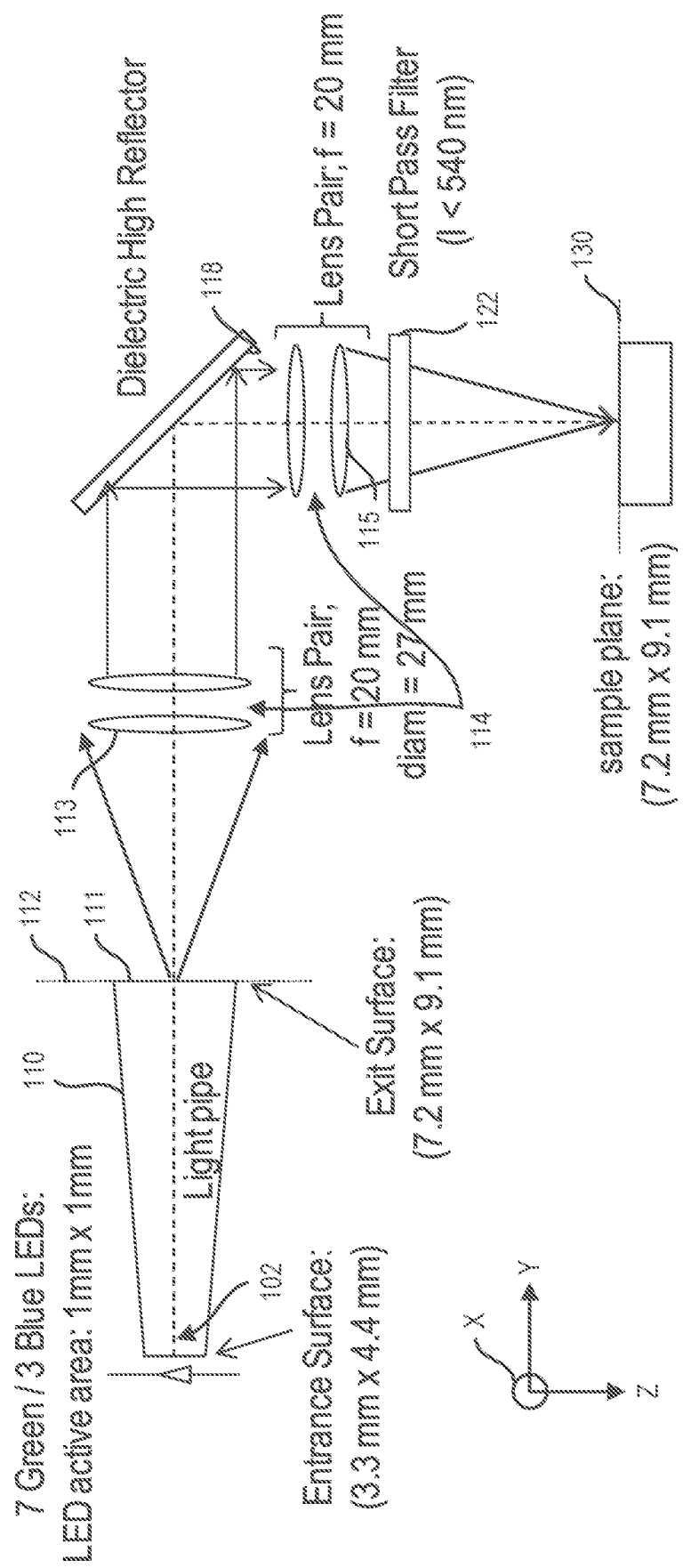
FIG. 7 is a schematic diagram of a light energy exciter according to one example.

A specification for components of light energy exciter 10 according to one example are set forth FIG. 7 illustrating various optical parameter values for light energy exciter 10 according to one example. In the example illustrated in FIG. 7 lens 114 has a 1:1 magnification so that a size of the projected image at the image plane 130 is in common with the size of the object (the light exit surface 111) at the object plane 112. Light energy exciter 10 according to one example can produce green illumination intensity of about 5 W/cm^2 at 2 A drive current per LED die and blue illumination intensity of about 7 W/cm^2 at 2 A drive current per LED die. An illumination uniformity of about >75% can be achieved within the whole illumination area. Materials for use in light energy exciter 10 are set forth in Table 1 hereinbelow.

TABLE 1

| Item | Description | Property |
|---|---|---|
| 102 | Light source bank provided by LEDs | SemiLed ® Version 40 mil chips: Proto; Green: 7 dies; 0.6 W/die; 1 × 1 mm²; 525 nm, (±5 nm) Proto; Blue: 3 dies; 1.3 W/die; 1 × 1 mm²; 460 nm, (±5 nm) (SemiLed is a trademark of SemiLEDs Optoelectronics Co., Ltd.) |
| 110 | Light pipe | Material: N-BK7 ® (N-BK7 is a registered trademark of SCHOTT Corporation) Length = 35 mm Entrance: 3.3 mm × 4.4 mm; Exit: 7.2 mm × 9.1 mm |
| 114 | Lens provided by a lens pair | Material: Zeonor ® 330R feff = 20 mm (Zeonor is a registered trademark of Zeon Corporation) |
| 122 | Filter | Semrock ® short pass filter; (Semrock is a registered trademark of Semrock, Inc.) Substrate Material: Fused Silica; short pass filter λ <540 nm |
| 126 | Window | Substrate Material: fused silica Coating: Broadband Dielectric Thickness; 1 mm |
| 118 | Reflector provided by a fold mirror | Substrate Material: N-BK7 ® (N-BK7 is a registered trademark of SCHOTT Corporation) Coating: Broadband Dielectric |

In another example, light pipe 110 can be shaped so that a light exit surface 111 of light pipe 110 can have a shape other than a rectilinear shape, e.g. can have a circular cross section taken along 6-6 transverse to optical axis 106). Such an example can be advantageous where sample supporting detector surface 206 has a perimeter that is of a shape other than a rectilinear shape and corresponds to the shape of light exit surface 111.

A design for light energy exciter 10 can be readily be modified for optimization with different detectors according to detector 200 having different detector surfaces 206 with different shapes. For example, a first detector according to detector 200 can have a rectangular shaped (from a top view along Z axis) detector surface 206, a second detector according to detector 200 can have a square shaped detector surface 206, and a third detector according to detector 200 can have a circle shaped detector surface 206. Because lens 114 is configured to image object plane 112 coinciding with light exit surface 111 onto detector surface 206, light energy exciter 10 can be optimized for use with any of the differently shaped detectors simply by changing light pipe 110 to be a different configuration. According to one example, as indicated by dashed line 132 of FIG. 2 which indicates a holder for holding an interchangeable module light energy exciter 10 can be of modular construction with a light pipe module 133 being removably exchangeable and light energy exciter 10 can be provided with multiple of such light pipe blocks modules each with a differently configured one or more light pipe 110. Optimizing light energy exciter 10 for use with a differently shaped detector 200 having a differently shaped detector surface 206 can include simply switching out a first currently installed light pipe module 133 having a first light pipe 110 and first pipe light exit surface 111 of a first shape with a second light pipe module 133 having a second light pipe 110 and light pipe exit surface 111 of a second shape that matches the shape the differently shaped detector 200 having a differently shaped detector surface 206. Light energy exciter 10 can be configured so that when a different module is installed into a holder of housing 114 as indicated by dashed line 132, the light exit surface 111 of a light pipe 110 of the newly installed module 133 is located on the object plane 112 so that the light exit surface 111 of light pipe 110 can be imaged onto image plane located on detector surface 206.

Figure 8:
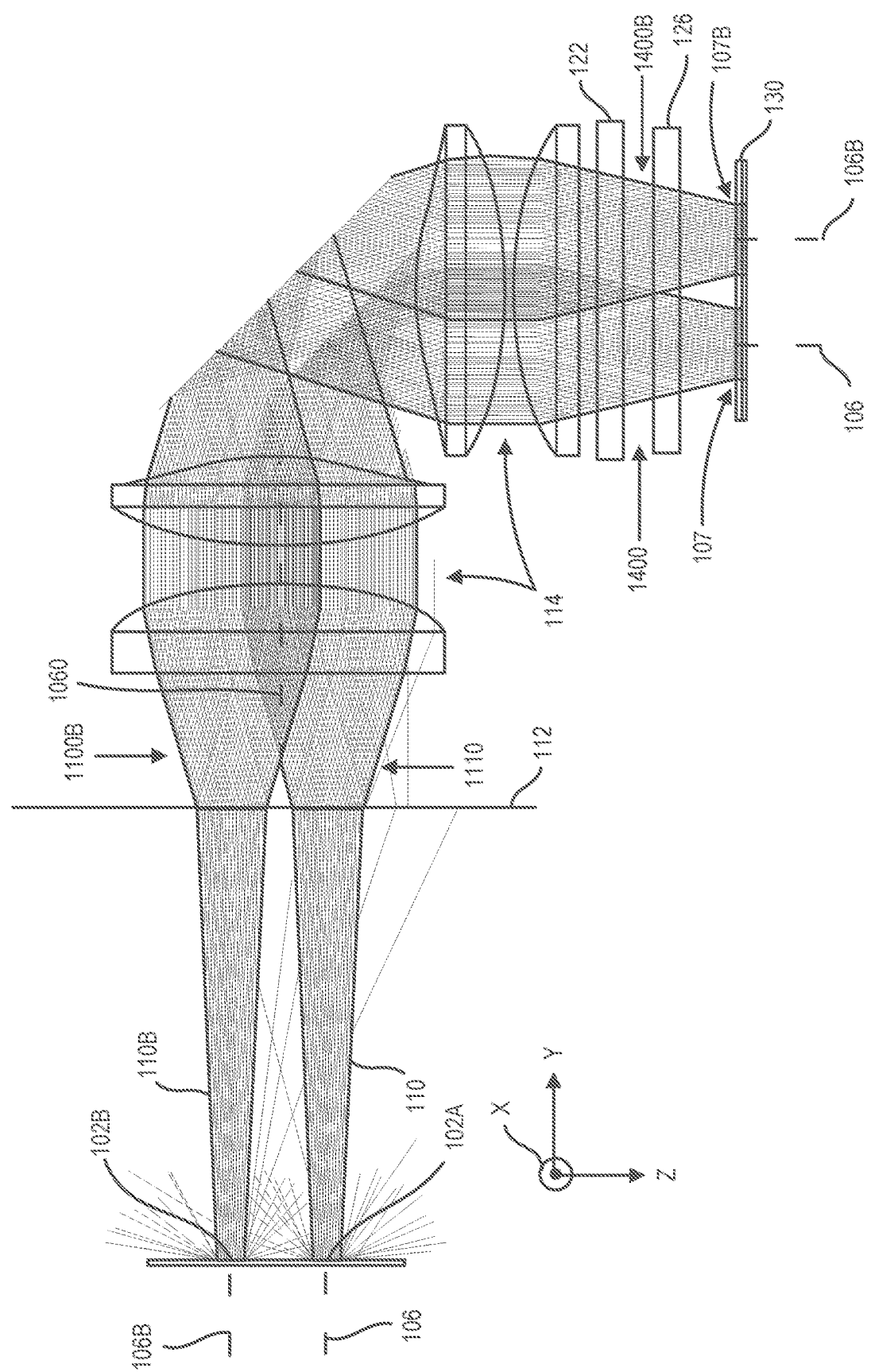
FIG. 8 is a ray trace diagram illustrating operation of a light energy exciter having first and second light pipes according to one example.

In the example of FIG. 8 light energy exciter 10 can include light pipe 110 as set forth herein and second light pipe 10B. Light pipe 110 can be surface coupled to a first light source 102A, e.g. provided by an LED and light pipe 10B can be surface coupled to a second light source 102B, e.g. provided by second LED. Light source 102A and light source 102B can be configured to emit light in the same wavelength band or different wavelength bands. Lens 114 can be configured to image object plane 112 defined at light exit surface 111 of light pipe 110 and second light pipe 110B onto image plane 130 which can be defined on detector surface 206. Thus, light energy exciter 10 can project two separate illumination patterns 107A and 107B onto detector surface 206, which can be advantageous in the case a biological or chemical test designer wishes to separate a detector surface 206 into separate test areas. According to one example, a test designer can specify that a test is to be performed using a first detector according to detector 200 and a second detector according to detector 200 and system 100 can be configured so that light energy exciter 10 projects the illumination areas 107 and 17B onto separate detector surfaces 206 respectively of the first and second different detectors 200.

There is set forth herein a light energy exciter 10, having a light source 102A and a second light source 102B, wherein the light pipe 110 receives excitation light from the light source 102A, and wherein the exciter comprises a second light pipe 110B housed in a common housing 134 with the light pipe 110, wherein the second light pipe 110B receive the excitation light from the second light source 102B, wherein the light pipe 110 and the second light pipe 110B propagate the excitation light emitted from the first light source 102A and the second light source 102B, respectively, and wherein the light energy exciter 10 shapes the excitation light propagating, respectively, through the light pipe 110 and the second light pipe 110B to define first and second separate illumination areas 107 and 107B.

The configuration as shown in FIG. 8 can define an optical axis 106 and a second optical axis 106B. In the single channel system as set forth in FIGS. 2-7, optical axis 106 can be co-located with a central axis 1060 of lens 114. In the example of FIG. 8 each of optical axis 106 and optical axis 106B can be offset and parallel to central axis 1060 of lens 114. Each of light pipe 110 and light pipe 110B can define a diverging cone of light 1100 and 1100B respectively having the divergence angle characteristics of diverging cone of light 1100 described with reference to the ray trace diagram (single channel system) described with reference to FIG. 3. Lens 114 can define respective converging cones of light 1400 and 1400B having the convergence angle characteristics of converging cone of light 1400 described with reference to the ray trace diagram (single channel system) described with reference to FIG. 3.

According to one example, light pipe 110 and light pipe 110B for defining first and second illumination channels can be included in a set of interchangeable modules 133 as set forth herein that can be interchangeably installed into a defined holder of housing 134 of light energy exciter 10 indicated by dashed line 132 described in connection with FIG. 2.

Figure 10:
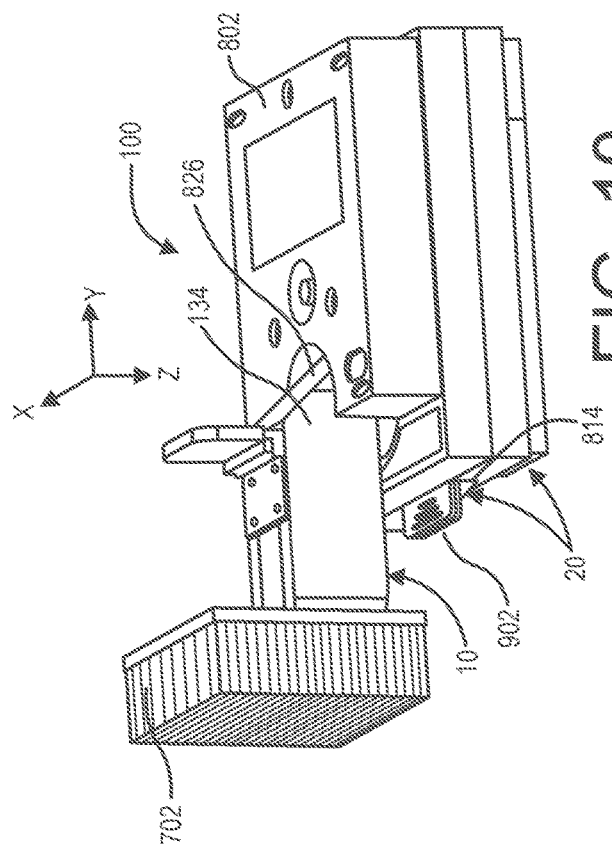
FIG. 10 is a perspective view of a system having a light energy exciter coupled with a detector assembly according to one example.
Figure 11:
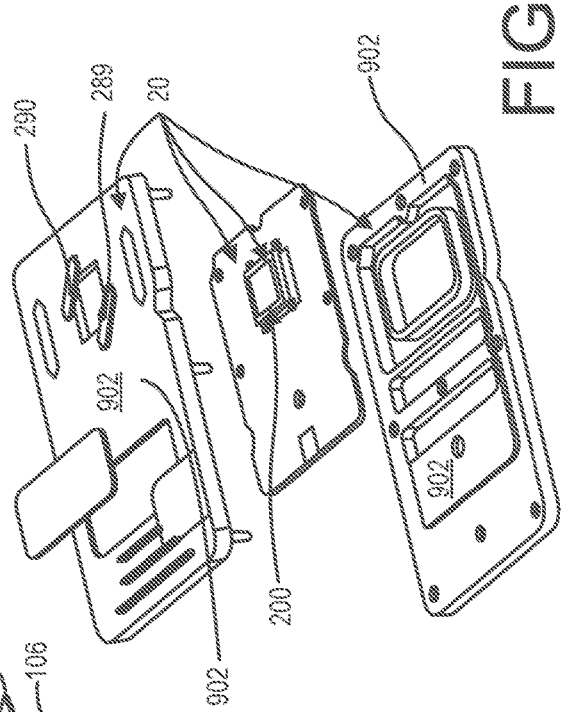
FIG. 11 is an assembly perspective view of a flow cell frame defining a flow cell according to one example.
Figure 9:
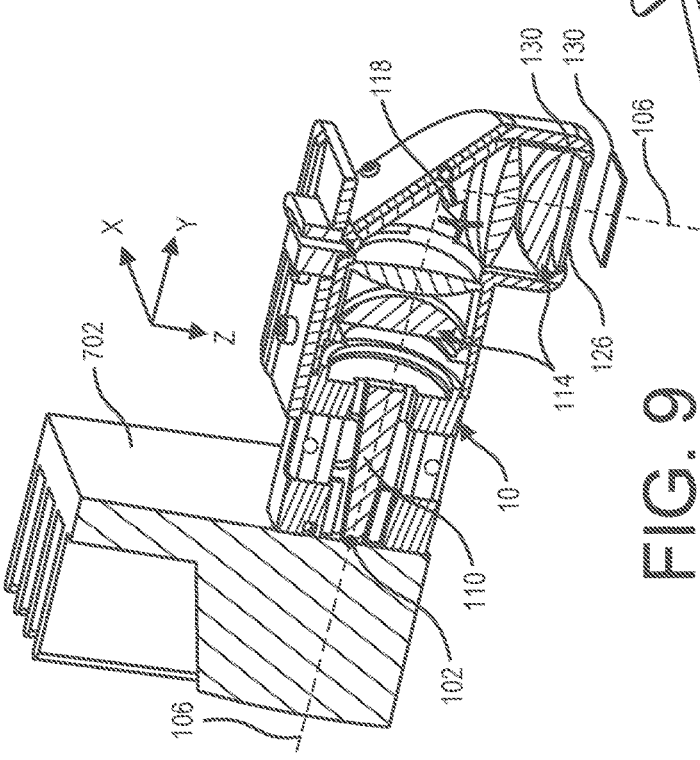
FIG. 9 is a perspective cutaway side view showing a light energy exciter according to one example.

FIG. 9 illustrates a cutaway physical form view of light energy exciter 10. As shown in FIG. 9, light energy exciter 10 can be mounted on a heat sink 702 for drawing heat away from light energy exciter 10 to improve the performance of light energy exciter 10. FIG. 10 is a perspective physical form view of system 100 having light energy exciter 10 coupled to detector assembly 20. As shown in FIG. 10 detector assembly 20 can include cartridge 802 that houses flow cell 282. Flow cell 282 can be defined by flow cell frame 902, as shown in FIG. 11, illustrating a perspective assembly physical form view of flow cell frame 902 defining flow cell 282. Flow cell frame 902 for example can include sidewalls 284 and flow cover 288 as depicted in the schematic view of FIG. 1.

Figure 12:
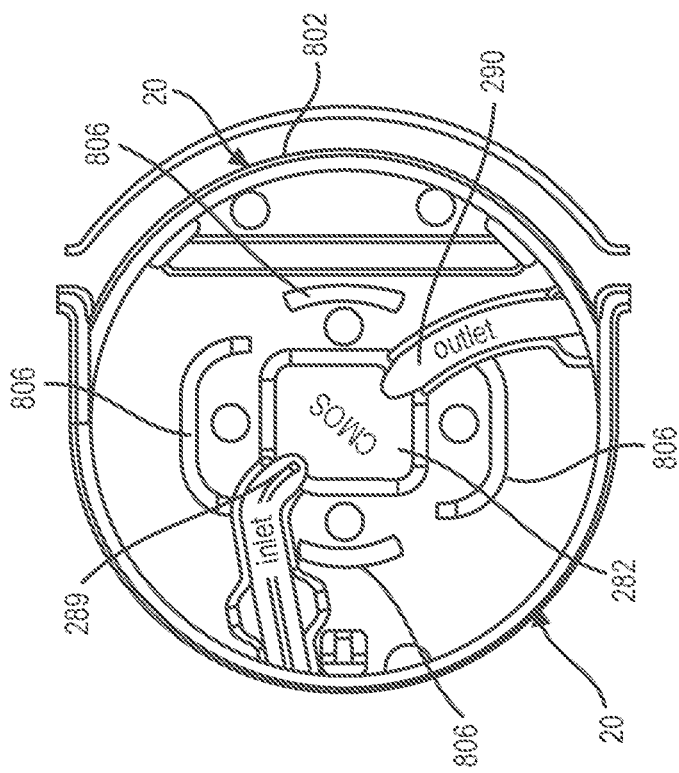
FIG. 12 is an internal view of a detector assembly cartridge defining registration features for alignment of a light energy exciter that can be coupled and aligned thereon according to one example.

FIG. 12 illustrates construction detail illustrating internal components of cartridge 802 of detector assembly 20. Cartridge 802 as shown in FIG. 12 can be configured to include physical registration features 806 which aid in the alignment of light energy exciter 10 to detector 200. As shown in FIG. 2, detector 200 is shown as being located in a location that is established by flow cell frame 902 having detector 200 and flow cell 282 received into slot 814 of cartridge 802. Physical registration features 806 can be provided to catch corresponding features of light energy exciter 10 that are defined by a distal end portion of housing 134 of light energy exciter 10. For coupling light energy exciter 10 to detector assembly 20 and detector 200, a distal end portion of housing 134 of light energy exciter 10 can be inserted into receptacle 826 of cartridge 802 of detector assembly 20 and arranged so that at a distal end of housing 134 of light energy exciter 10 is registered with corresponding registration features 806 as shown in FIG. 12 so that light energy exciter 10 is properly aligned with flow cell 282 and detector 200 as shown in FIG. 1.

Figure 13:
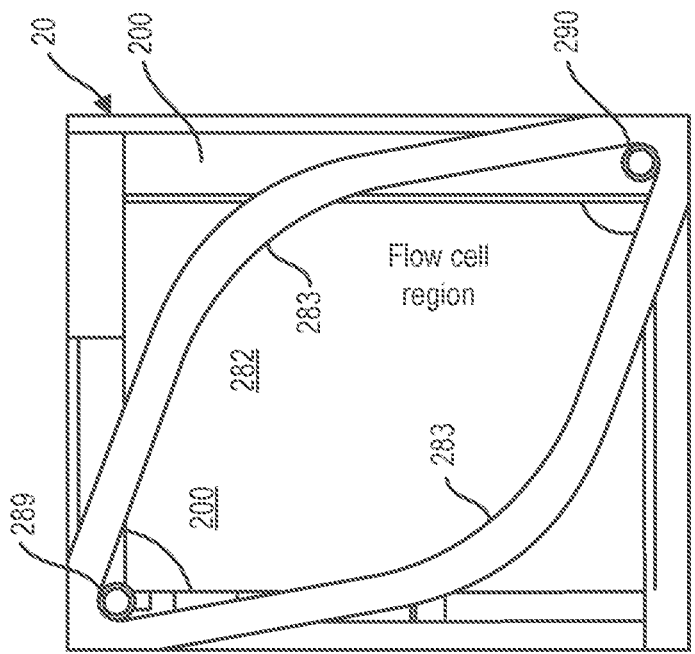
FIG. 13 is a top view of the flow cell defined with respect to a detector provided by an integrated circuit according to one example.

FIG. 13 illustrates a top view of a flow cell 282 disposed over detector 200. According to one example as shown in FIG. 13 flow cell 282 can include sidewalls 283 that shape flow cell 282 so that less than all light sensors 202 are active during a biological or chemical test. Detector 200 according to one example can include an array of 14M of light sensors which can be regarded as pixels and flow cell 282 can be configured by flow cell walls 283 so that about 8M of light sensors 202 are active during a biological or chemical test.

Figure 14:
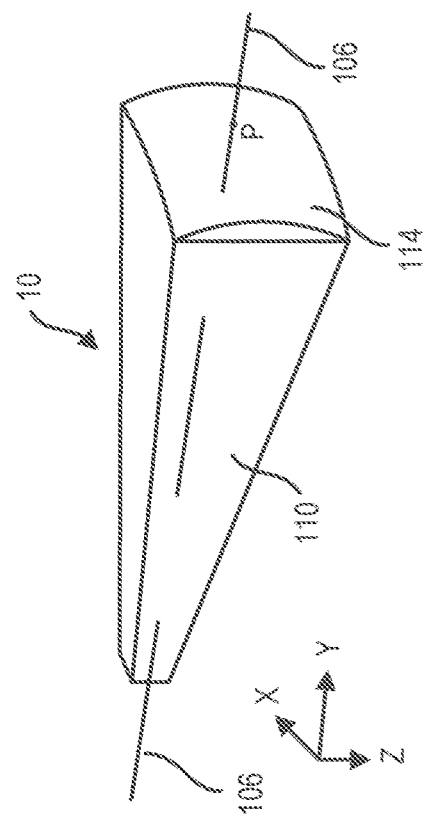
FIG. 14 is a light energy exciter provided by a single piece of material defining a light pipe and a lens according to one example.

Alternative examples of light energy exciter 10 are described with reference to FIGS. 14 and 15. According to one example as shown in FIG. 14, lens 114 can be formed integral with light pipe 110. FIG. 14 illustrates light pipe 110 and lens 114 integrally formed by a single piece of material defining both light pipe 110 and lens 114. Light energy exciter 10 can be configured so that lens 114 integrally formed with light pipe 110 projects homogenized light onto an image plane 130 which can be defined at detector surface 206 for supporting a sample (FIG. 1).

Figure 15:
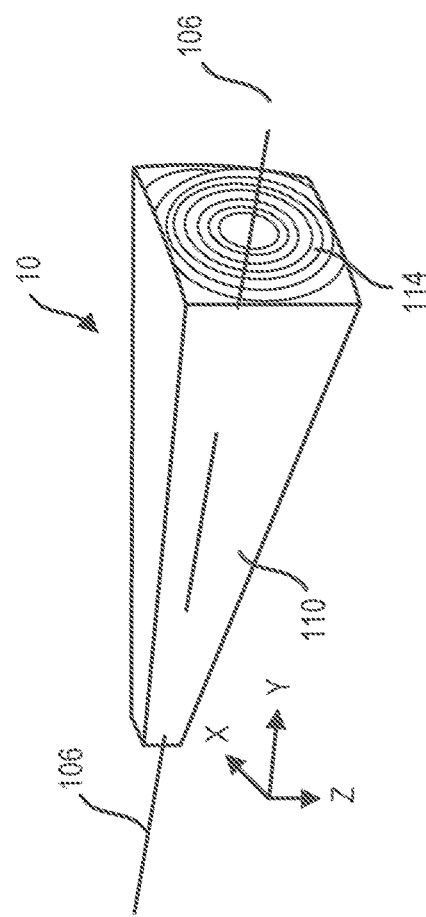
FIG. 15 is a perspective view of a light energy exciter having a single piece of material that commonly defines a light pipe and a lens, wherein the lens is provided by a Fresnel lens according to one example.

FIG. 15 illustrates another example of light energy exciter 10 having an integrated lens 114 that is integrally formed with light pipe 110 and defined with a single piece of material that commonly defines both lens 114 and light pipe 110. In the example of FIG. 15 lens 114 is shown as being provided by a Fresnel lens. Fresnel lenses can produce converging light rays with reduced lens thicknesses and therefore can provide space saving advantages. Lens 114 in the example of FIG. 13 can project homogenized light reflected within light pipe 110 onto image plane 130 which can be defined at sample supporting detector surface 206. In any example herein, including the example of FIGS. 14 and 15 a filter coating can be directly deposited at the light exit surface 115 of lens 114 to remove a discrete filter 22 of light energy exciter 10.

Figure 16:
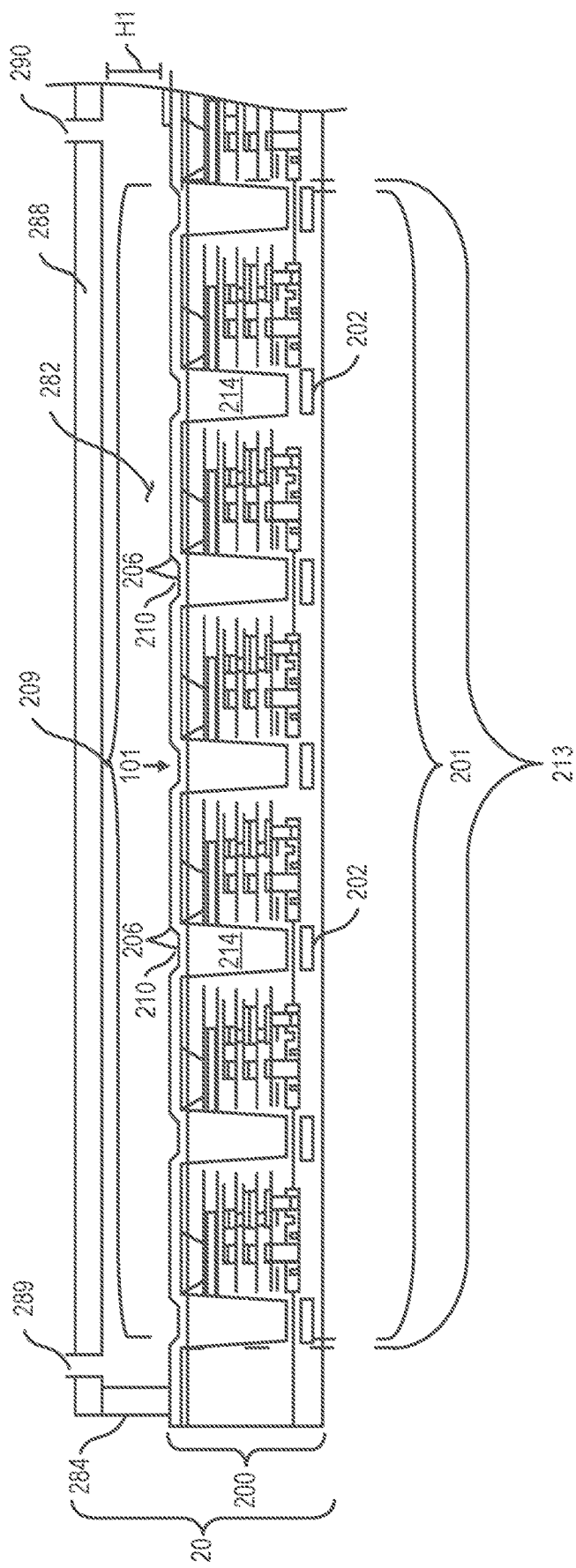
FIG. 16 is a cutaway side view of a portion of a detector provided by an integrated circuit having a light sensor array and an aligned light guide array according to one example.
Figure 17:
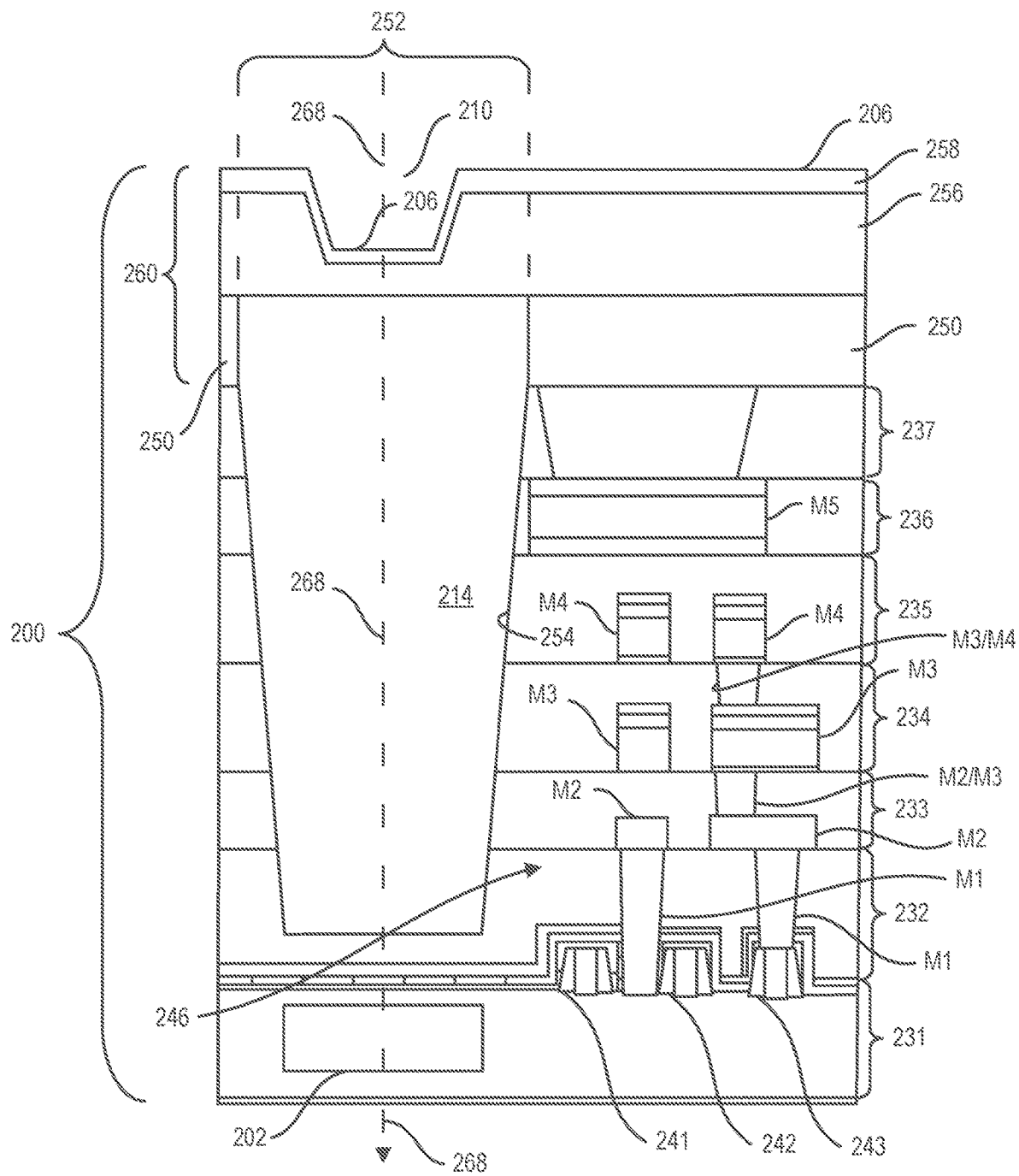
FIG. 17 is a cutaway side view of a portion of a detector provided by an integrated circuit having a light sensor and an aligned light guide according to one example.

FIGS. 16 and 17 illustrate further details of detector assembly 20 and detector 200 according to one example that can be used with light energy exciter 10.

In the illustrated example shown in FIG. 16, flow cell 282 is defined by detector surface 206 sidewall 284 and a flow cover 288 that is supported by the sidewall 284 and other sidewalls (not shown). The sidewalls can be coupled to the detector surface 206 and can extend between the flow cover 288 and the detector surface 206. In some examples, the sidewalls are formed from a curable adhesive layer that bonds the flow cover 288 to detector 200.

The flow cell 282 can include a height H1. By way of example only, the height H1 can be between about 50 μm to about 400 μm or, more particularly, about 80 μm to about 200 μm. The flow cover 288 can include a material that is light transmissive to excitation light 101 propagating from an exterior of the detector assembly 20 into the flow cell 282.

Also shown, the flow cover 288 can define inlet portal 289 and outlet portal 290 that are configured to fluidically engage other ports (not shown). For example, the other portals can be from a cartridge (not shown) or a workstation (not shown).

Detector 200 can include a sensor array 201 of light sensors 202, a guide array 213 of light guides 214, and a reaction array 209 of reaction recesses 210. In certain examples, the components are arranged such that each light sensor 202 aligns with a single light guide 214 and a single reaction recess 210. However, in other examples, a single light sensor 202 can receive photons through more than one light guide 214. In some examples there can be provided more than one light guide and/or reaction recess for each light sensor of a light sensor array.

In some examples there can be provided more than one light guide and/or light sensors aligned to a reaction recess of a reaction recess array. The term "array" does not necessarily include each and every item of a certain type that the detector 200 can have. For example, the sensor array 201 of light sensors 202 may not include each and every light sensor of detector 200. As another example, the guide array 213 may not include each and every light guide 214 of detector 200. As another example, the reaction array 209 may not include each and every reaction recess 210 of detector 200. As such, unless explicitly recited otherwise, the term "array" may or may not include all such items of detector 200.

Detector 200 has a detector surface 206 that can be functionalized (e.g., chemically or physically modified in a suitable manner for conducting designated reactions). For example, the detector surface 206 can be functionalized and can include a plurality of reaction sites having one or more biomolecules immobilized thereto. The detector surface 206 can have a reaction array 209 of reaction recesses 210. Each of the reaction recesses 210 can include one or more of the reaction sites. The reaction recesses 210 can be defined by, for example, an indent or change in depth along the detector surface 206. In other examples, the detector surface 206 can be substantially planar.

FIG. 17 is an enlarged cross-section of detector 200 showing various features in greater detail. More specifically, FIG. 17 shows a single light sensor 202, a single light guide 214 for directing emissions signal light 501 toward the light sensor 202, and associated circuitry 246 for transmitting signals based on emissions signal light 501 (e.g., photons) detected by the light sensor 202. It is understood that the other light sensors 202 of the sensor array 201 (FIG. 16) and associated components can be configured in an identical or similar manner. It is also understood, however, the detector 200 is not required to be manufactured identically or uniformly throughout. Instead, one or more light sensors 202 and/or associated components can be manufactured differently or have different relationships with respect to one another.

The circuitry 246 can include interconnected conductive elements (e.g., conductors, traces, vias, interconnects, etc.) that are capable of conducting electrical current, such as the transmission of data signals that are based on detected photons. Detector 200 comprises an integrated circuit having a planar array of the light sensors 202. The circuitry 246 formed within detector 200 can be configured for at least one of read out signals from light sensors 202 exposed during an exposure period (integration period) in which charge accumulates on light sensors 202 in dependence on emission signal light 501 received by light sensors 202, signal amplification, digitization, storage, and processing. The circuitry 246 can collect and analyze the detected emissions signal light 501 and generate data signals for communicating detection data to a bioassay system. The circuitry 246 can also perform additional analog and/or digital signal processing in detector 200. Light sensors 202 can be electrically coupled to circuitry 246 through gates 241-243.

Detector 200 according to one example can be provided by a solid-state integrated circuit detector such as a CMOS integrated circuit detector or a CCD integrated circuit detector. Detector 200 according to one example can be an integrated circuit chip manufactured using integrated circuit manufacturing processes such as complementary metal oxide semiconductor (CMOS) fabrication processes.

The resolution of the sensor array 201 defined by light sensors 202 can be greater than about 0.5 megapixels (Mpixels). In more specific examples, the resolution can be greater than about 5 Mpixels and, more particularly, greater than about 14 Mpixels.

Detector 200 can include a plurality of stacked layers 231-237 including a sensor layer 231 which sensor layer 231 can be a silicon layer. The stacked layers can include a plurality of dielectric layers 232-237. In the illustrated example, each of the dielectric layers 232-237 includes metallic elements (e.g., W (tungsten), Cu (copper), or Al (aluminum)) and dielectric material, e.g. $SiO_2$. Various metallic elements and dielectric material can be used, such as those suitable for integrated circuit manufacturing. However, in other examples, one or more of the dielectric layers 232-237 can include only dielectric material, such as one or more layers of $SiO_2$.

With respect to the specific example of FIG. 17, the dielectric layers 232-237 can include metallization layers that are labeled as layers M1-M5 in FIG. 17. As shown, the metallization layers, M1-M5, can be configured to form at least a portion of the circuitry 246.

In some examples, detector 200 can include a shield structure 250 having one or more layers that extends throughout an area above metallization layer M5. In the illustrated example, the shield structure 250 can include a material that is configured to block the light signals that are propagating from the flow cell 282. The light signals can be the excitation light 101 and/or emissions signal light 501. By way of example only, the shield structure 250 can comprise tungsten (W). By way of specific example only, the excitation light may have a peak wavelength of about 523 nm (green light) or 456 nm (blue light) and emissions signal light 501 can include wavelengths of about 570 nm and longer (FIG. 4).

As shown in FIG. 17, shield structure 250 can include an aperture 252 therethrough. The shield structure 250 can include an array of such apertures 252. Aperture 252 can be dimensioned to allow signal emission light to propagate to light guide 214. Detector 200 can also include a passivation layer 256 that extends along the shield structure 250 and across the apertures 252. Detector 200 can also include a passivation layer 258 comprising detector surface 206 that extends along passivation layer 256 and across the apertures 252. Shield structure 250 can extend over the apertures 252 thereby directly or indirectly covering the apertures 252. Passivation layer 256 and passivation layer 258 can be configured to protect lower elevation layers and the shield structure 250 from the fluidic environment of the flow cell 282. According to one example, passivation layer 256 is formed of SiN or similar. According to one example, passivation layer 258 is formed of tantalum pentoxide ($Ta_2O_5$) or similar. Structure 260 having passivation layer 256 and passivation layer 258 can define detector surface 206 having reaction recesses 210. Structure 260 defining detector surface 206 can have any number of layers such as one to N layer.

Structure 260 can define a solid surface (i.e., the detector surface 206) that permits biomolecules or other analytes-of-interest to be immobilized thereon. For example, each of the reaction sites of a reaction recess 210 can include a cluster of biomolecules that are immobilized to the detector surface 206 of the passivation layer 258. Thus, the passivation layer 258 can be formed from a material that permits the reaction sites of reaction recesses 210 to be immobilized thereto. The passivation layer 258 can also comprise a material that is at least transparent to a desired fluorescent light. Passivation layer 258 can be physically or chemically modified to facilitate immobilizing the biomolecules and/or to facilitate detection of the emissions signal light 501.

In the illustrated example, a portion of the passivation layer 256 extends along the shield structure 250 and a portion of the passivation layer 256 extends directly along filter material defining light guide 214. The reaction recess 210 can be aligned with and formed directly over light guide 214. According to one example each of reaction recess 210 and light guide 214 can have cross sectional geometric centers centered on longitudinal axis 268. Filter material can be deposited in a cavity defined by sidewalls 254 formed in a dielectric stack having stacked layers 232-237.

The light guide 214 can be configured relative to surrounding material of the dielectric stack defined by dielectric layers 231-237 to form a light-guiding structure. For example, the light guide 214 can have a refractive index of at least about 1.6 according to one example so that light energy propagating through light guide 214 is substantially reflected at an interface at sidewalls 254 between light guide 214 and the surrounding dielectric stack defined by dielectric layers 231-237. In certain examples, the light guide 214 can be configured such that the optical density (OD) or absorbance of the excitation light is at least about 4 OD. More specifically, the filter material can be selected and the light guide 214 can be dimensioned to achieve at least 4 OD. In more particular examples, the light guide 214 can be configured to achieve at least about 5 OD or at least about 6 OD. In more particular examples, the light guide 214 can be configured to achieve at least about 7 OD or at least about 8 OD. Other features of the detector 200 can be configured to reduce electrical and optical crosstalk.

In reference to FIG. 18, further details of process control system 310 are described. Process control system 310 can include according to one example one or more processors 3101, memory 3102, and one or more input/output interface 3103. One or more processors 3101, memory 3102 and one or more input/output interface can be connected via system bus 3104. According to one example process control system 3110 can be provided by a computer system as set forth in FIG. 18. Memory 3102 can include a combination of system memory and storage memory. Memory 3102 according to one example can store one or more programs for facilitating processes that are set forth herein. One or more processors 3101 can run one or more programs stored in memory 3102 to facilitate processes as is set forth herein. Memory 3102 can define a computer readable medium.

A DNA sequencing process facilitated by light energy exciter 10 is described with reference to FIGS. 19 and 20. Referring to FIG. 19, there is shown a spectral profile coordination diagram illustrating aspects of the operation of system 100. According to one example light source bank 102 can include light sources that emit light at first and second different wavelengths. Providing light source bank 102 to include light sources that emit excitation light at first and second different wavelength ranges facilitates dye chemistry DNA sequence reconstruction processes in which first and second dyes can be disposed in fluid within flow cell 282.

Spectral profile 1702 shown in FIG. 19 illustrates an excitation wavelength emission band of a green emitting light source of light energy exciter 10, e.g. such as light source 102A as shown in FIG. 4. Spectral profile 1712 is the wavelength emission band of a blue emitting light source of light energy exciter 10 such as light source 102H as shown in FIG. 4. Spectral profile 1704 is the absorption band spectral profile of a first fluorophore sensitive to green light that can be disposed with fluid into flow cell 282. Spectral profile 1714 is the absorption band spectral profile of a second fluorophore sensitive to blue light that can be disposed with fluid into flow cell 282. Spectral profile 1707 is the absorption band spectral profile of a third fluorophore sensitive to green light and blue light that can be disposed with fluid into flow cell 282.

Spectral profile 1706 is the partial spectral profile of emissions signal light 501 attributable to the first fluorophore fluorescing when excited by green light having spectral profile 1702. Spectral profile 1716 is the partial spectral profile of emissions signal light 501 attributable to the second fluorophore fluorescing when excited by blue light having spectral profile 1712. Spectral profile 1708 is the partial spectral profile of emissions signal light 501 attributable to the third fluorophore fluorescing when excited by green light having spectral profile 1702. Spectral profile 1709 is the partial spectral profile of emissions signal light 501 attributable to the third fluorophore fluorescing when excited by blue light having spectral profile 1712.

Spectral profile 1730 is the transmission spectral profile of light sensors 202 defining light sensor array 201 indicating the detection band of light sensor array 201.

Examples herein recognize in reference to the spectral profile coordination diagram of FIG. 19 that process control system 310 can be configured to (a) determine that the first fluorophore is attached to a sample 502 based on fluorescence being sensed by a light sensor 202 under excitation restricted to excitation by one or more green emitting light sources and fluorescence not being sensed by the light sensor 202 under excitation restricted to excitation by one or more blue emitting light source; (b) determine that the second fluorophore is attached to a sample 502 based on fluorescence being sensed by a light sensor 202 under excitation restricted to excitation by one or more blue emitting light sources and fluorescence not being sensed by the light sensor 202 under excitation restricted to excitation by one or more green emitting light sources; and (c) determine that the third fluorophore is attached to a sample 502 based on fluorescence being sensed by a light sensor 202 under excitation restricted to excitation by one or more green emitting light sources and fluorescence also being sensed by the light sensor 202 under excitation restricted to excitation by one or more blue emitting light sources. Process control system 310 can discriminate which fluorophores have attached to samples, and can determine nucleotide types, e.g. A, C, T, and G that are present in a fragment of a DNA strand providing a sample 502 e.g. using a decision logic data structure indicated by the decision logic table of Table 2 mapping fluorophore presence to nucleotide type, where discriminated nucleotides Nucleotide-Nucleotide4 are nucleotides of the nucleotide types A, C, T and G (the particular mapping based on the test setup parameters).

TABLE 2

| Detected fluorescence under excitation restricted to excitation by one or more green emitting light sources | Detected fluorescence under excitation restricted to excitation by one or more blue emitting light sources | Fluorophore presence indicated | Nucleotide indicated |
| --- | --- | --- | --- |
| YES | NO | first Fluorophore | Nucleotide1 |
| NO | YES | second Fluorophore | Nucleotide2 |
| YES | YES | third Fluorophore | Nucleotide3 |
| NO | NO | — | Nucleotide4 |

Process control system 310 can run a process in support of DNA sequence reconstruction in a plurality of cycles. In each cycle, a different portion of a DNA fragment can be subject to sequencing processing to determine a nucleotide type, e.g. A, C, T, or G, associated to the fragment, e.g. using a decision data structure such as a decision data structure as set forth in Table 2. Aspects of a process which can be run by process control system 310 for use in performing DNA sequence reconstruction using light energy exciter 10 is described in the flowchart of FIG. 20.

At block 1802 process control system 310 can clear flow cell 282, meaning process control system 310 can remove fluid from flow cell 282 used during a prior cycle. At block 1804, process control system 310 can input into flow cell 282 fluid having multiple fluorophores, e.g. first and second fluorophores, or first, second and third fluorophores. The first and second fluorophores can include, e.g. the absorption characteristics described with reference to absorption band spectral profile 1704 and absorption band spectral profile 1714 respectively as described in reference to the spectral profile diagram of FIG. 19. First second and third fluorophores can include, e.g. the absorption characteristics described with reference to absorption band spectral profile 1704 and absorption band spectral profile 1714 and absorption band spectral profile 1707 respectively as described in reference to the spectral profile diagram of FIG. 19.

At block 1806, process control system 310 can read out signals from light sensors 202 exposed with a first wavelength range excitation active. At block 1806, process control system 310 can control light energy exciter 10 so that during an exposure period of light sensors 202 light energy exciter 10 emits excitation light restricted excitation by one or more green light sources. At block 1806, process control system 310 can during an exposure period of light sensors 202 energize each one or more green emitting light sources of light source bank 102, e.g. light sources 102A-102G as set forth in FIG. 4, while maintaining in a deenergized state each one or more blue emitting light sources of light bank, e.g. light sources 102H-102J as set forth in FIG. 4. With the light source bank 102 being controlled as described so that green light sources are on and blue light sources are off during an exposure period of light sensors 202, process control system 310 at block 1806 can read out first signals from light sensors 202 exposed with excitation restricted to excitation by one or more green light sources as set forth herein.

At block 1808, process control system 310 can read out signals from light sensors 202 exposed with a second wavelength range excitation active. At block 1808, process control system 310 can control light energy exciter 10 so that during an exposure period of light sensors 202 light energy exciter 10 emits excitation light restricted to excitation by one or more blue light sources of light energy exciter 10. At block 1808, process control system 310 can during an exposure period of light sensors 202 energize each of one or more blue emitting light sources of light source bank 102, e.g. light sources 102H-102J as set forth in FIG. 4, while maintaining in a deenergized state each one or more green emitting light sources of light bank, e.g. light sources 102A-102G as set forth in FIG. 4. With the light source bank 102 being controlled as described so that blue light sources are on and green light sources are off during an exposure period of light sensors 202, process control system 310 at block 1808 can read out second signals from light sensors 202 exposed with excitation restricted to excitation by one or more blue light sources as set forth herein.

At block 1810 process control system 310 for the current cycle can process the first signals read out at block 1806 and the second signals read out at block 1808 to determine a nucleotide type of the DNA fragment being subject to testing during the current cycle, e.g. using a decision data structure as set forth in Table 2 according to one example. Process control system 310 can perform the described nucleotide identification process described with reference to the flowchart of FIG. 20 for each cycle of the DNA sequencing process until nucleotide identification is performed for each scheduled cycle.

Process control system 310 can be configured to perform a wide range of tests for testing operation of the system 100. Process control system 310 can perform a calibration test in which operation of light energy exciter 10 and detector 200 is tested. In such an example process control system 310 can be configured to selectively energize different lights sources during exposure periods of sensor array 201 and can examine signals read out of sensor array 201 during the exposure periods. A method can include selectively energizing a first light source (e.g. green emitting) during a first exposure period of the light sensors with second (blue emitting) and third (e.g. red emitting) light sources maintained in a deenergized state, selectively energizing the second light source during a second exposure period of the light sensors with the first and third light sources maintained in a deenergized state, and selectively energizing the third light source during a third exposure period of the light sensors with the first and second light sources maintained in a deenergized state.

It should be appreciated that all combinations of the foregoing concepts and additional concepts discussed in greater detail below (provided such concepts are not mutually inconsistent) are contemplated as being part of the subject matter disclosed herein. In particular, all combinations of claims subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely exemplary. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements it will be understood that the subject matter can be practiced with less than or greater than the certain number of elements. Accordingly, the subject matter is not to be seen as limited by the foregoing description, but is only limited by the scope of the appended claims.

What is claimed is:

1. A method comprising:
    emitting with a light energy exciter excitation light, wherein the light energy exciter comprises a first light source and a second light source, the first light source to emit excitation light rays in a green wavelength emission band, the second light source to emit excitation light rays in a blue wavelength emission band, wherein the emitting with a light energy exciter includes imaging a light pipe light exit surface of the light energy exciter to project an illumination pattern that matches a size and shape of a detector surface;
    receiving with a detector the excitation light and emissions signal light resulting from excitation by the excitation light, the detector comprising the detector surface and a sensor array spaced apart from the detector surface, the detector surface for supporting biological or chemical samples, the detector blocking the excitation light and permitting the emissions signal light to propagate toward light sensors of the sensor array; and
    transmitting with circuitry of the detector data signals in dependence on photons sensed by the light sensors of the sensor array;
    wherein the method comprises for each of a plurality of cycles in support of a DNA sequencing process:
        (a) removing fluid from a flow cell defined by the detector surface,
        (b) filling the flow cell with a fluid having at least three fluorophores,
        (c) reading out first signals from the light sensors exposed to emissions signal light with the first light source energized and the second light source maintained in a deenergized state,
        (d) reading out second signals from the light sensors exposed to emissions signal light with the second light source energized and the first light source maintained in a deenergized state, and
        (e) identifying a DNA nucleotide using signals of the first signals and signals of the second signals, comprising:
            determining that a first fluorophore is attached to a sample based on fluorescence being detected in step (c) but not in step (d);
            determining that a second fluorophore is attached to a sample based on fluorescence being detected in step (d) but not in step (c);
            determining that a third fluorophore is attached to a sample based on fluorescence being detected in both step (c) and step (d).

2. The method of claim 1, wherein the method includes fabricating the detector using complementary metal oxide semiconductor (CMOS) integrated circuit fabrication technology.

3. The method of claim 1, wherein the light energy exciter comprises a third light source to emit light in a third wavelength emission band, wherein the emitting includes selectively energizing the first light source during a first exposure period of the light sensors with the second light source and the third light source maintained in a deenergized state, wherein the emitting comprises selectively energizing the second light source during a second exposure period of the light sensors with the first light source and the third light source maintained in a deenergized state, wherein the emitting comprises selectively energizing the third light source during a third exposure period of the light sensors with the first light source and the second light source maintained in a deenergized state.

4. The method of claim 1, wherein the method includes finding that a first nucleotide is present in the sample based on the determining that the first fluorophore is attached to the sample, finding that a second nucleotide is present in the sample based on the determining that the second fluorophore is attached to the sample, finding that a third nucleotide is present in the sample based on the determining that the third fluorophore is attached to the sample, and finding that a fourth nucleotide is present in the sample based on fluorescence being detected in neither of step (c) nor step (d).

5. The method of claim 1, wherein the emitting with a light energy exciter includes imaging a light pipe light exit surface of a light pipe of the light energy exciter to project an illumination pattern that matches a size and shape of the detector surface, and wherein the method includes directing light from the first light source into a light entry surface of the light pipe when the first light source is energized, and wherein the method includes directing light from the second light source into the light entry surface of the light pipe when the second light source is energized.

6. A method comprising:
emitting with a light energy exciter excitation light, wherein the light energy exciter comprises a first light source and a second light source, the first light source to emit excitation light rays in a green wavelength emission band, the second light source to emit excitation light rays in a blue wavelength emission band, wherein the emitting with a light energy exciter includes imaging a light pipe light exit surface of a light pipe of the light energy exciter to project an illumination pattern that matches a size and shape of a detector surface, wherein the imaging includes performing the imaging with use of a lens that converges excitation light rays exiting the light pipe light exit surface;
receiving with a detector the excitation light and emissions signal light resulting from excitation by the excitation light, the detector comprising the detector surface and a sensor array spaced apart from the detector surface, the detector surface for supporting biological or chemical samples, the detector blocking the excitation light and permitting the emissions signal light to propagate toward light sensors of the sensor array; and
transmitting with circuitry of the detector data signals in dependence on photons sensed by the light sensors of the sensor array;
wherein the method comprises for each of a plurality of cycles in support of a DNA sequencing process:
(k) removing fluid from a flow cell defined by the detector surface,
(l) filling the flow cell with a fluid having at least three fluorophores,
(m) reading out first signals from the light sensors exposed to emissions signal light with the first light source energized and the second light source maintained in a deenergized state,
(n) reading out second signals from the light sensors exposed to emissions signal light with the second light source energized and the first light source maintained in a deenergized state, and
(o) identifying a DNA nucleotide using signals of the first signals and signals of the second signals, comprising:
determining that a first fluorophore is attached to a sample based on fluorescence being detected in step (m) but not in step (n);
determining that a second fluorophore is attached to a sample based on fluorescence being detected in step (n) but not in step (m);
determining that a third fluorophore is attached to a sample based on fluorescence being detected in both step (m) and step (n).

7. The method of claim 6, wherein the emitting includes shaping excitation light with the light pipe so that excitation light rays exiting the light pipe light exit surface define a diverging cone of light that diverges with respect to an optical axis of the light energy exciter, wherein the imaging includes performing the imaging with use of the lens that converges the excitation light rays exiting the light pipe light exit surface defining the diverging cone of light to focus an image of an object defined at an object plane onto an image plane, wherein the object plane is defined at the light pipe light exit surface such that the object defined at the object plane is the light pipe light exit surface, and wherein the image plane is defined at the detector surface.

8. The method of claim 6, wherein the emitting includes shaping excitation light with the light pipe so that excitation light rays exiting the light pipe light exit surface define a diverging cone of light that diverges with respect to an optical axis of the light energy exciter, wherein the imaging includes performing the imaging with use of the lens that converges the excitation light rays exiting the light pipe light exit surface defining the diverging cone of light to focus an image of an object defined at an object plane onto an image plane, wherein the object plane is defined at the light pipe light exit surface such that the object defined at the object plane is the light pipe light exit surface, and wherein the image plane is defined at the detector surface, and wherein the method includes providing the light pipe light exit surface to include a rectilinear shape in common with a shape of the detector surface.

9. The method of claim 6, wherein the method includes finding that a first nucleotide is present in the sample based on the determining that the first fluorophore is attached to the sample, finding that a second nucleotide is present in the sample based on the determining that the second fluorophore is attached to the sample, finding that a third nucleotide is present in the sample based on the determining that the third fluorophore is attached to the sample, and finding that a fourth nucleotide is present in the sample based on fluorescence being detected in neither of step (m) nor step (n), and wherein the method includes directing light from the first light source into a light entry surface of the light pipe when the first light source is energized, and wherein the method includes directing light from the second light source into the light entry surface of the light pipe when the second light source is energized, wherein the emitting includes shaping excitation light with the light pipe so that excitation light rays exiting the light pipe light exit surface define a diverging cone of light that diverges with respect to an optical axis of the light energy exciter, wherein the imaging includes performing the imaging with use of the lens that converges the excitation light rays exiting the light pipe light exit surface defining the diverging cone of light to focus an image of an object defined at an object plane onto an image plane, wherein the object plane is defined at the light pipe light exit surface such that the object defined at the object plane is the light pipe light exit surface, and wherein the image plane is defined at the detector surface, and wherein the method includes providing the light pipe light exit surface to include a rectilinear shape in common with a shape of the detector surface.

10. A method comprising:
  emitting with a light energy exciter excitation light, wherein the light energy exciter comprises a first light source and a second light source, the first light source to emit excitation light rays in a green wavelength emission band, the second light source to emit excitation light rays in a blue wavelength emission band, wherein the emitting with a light energy exciter includes imaging a light pipe light exit surface of a light pipe of the light energy exciter to project an illumination pattern that matches a size and shape of a detector surface, and wherein the emitting includes shaping excitation light with the light pipe so that excitation light rays exiting the light pipe light exit surface define a diverging cone of light that diverges with respect to an optical axis of the light energy exciter;
  receiving with a detector the excitation light and emissions signal light resulting from excitation by the excitation light, the detector comprising the detector surface and a sensor array spaced apart from the detector surface, the detector surface for supporting biological or chemical samples, the detector permitting the emissions signal light to propagate toward light sensors of the sensor array; and
  transmitting with circuitry of the detector data signals in dependence on photons sensed by the light sensors of the sensor array;
  wherein the method comprises for each of a plurality of cycles in support of a DNA sequencing process:
    (f) removing fluid from a flow cell defined by the detector surface,
    (g) filling the flow cell with a fluid having at least three fluorophores,
    (h) reading out first signals from the light sensors exposed to emissions signal light with the first light source energized and the second light source maintained in a deenergized state,
    (i) reading out second signals from the light sensors exposed to emissions signal light with the second light source energized and the first light source maintained in a deenergized state, and
    (j) identifying a DNA nucleotide using signals of the first signals and signals of the second signals, comprising:
      determining that a first fluorophore is attached to a sample based on fluorescence being detected in step (h) but not in step (i);
      determining that a second fluorophore is attached to a sample based on fluorescence being detected in step (i) but not in step (h);
      determining that a third fluorophore is attached to a sample based on fluorescence being detected in both step (h) and step (i).

11. The method of claim 6, wherein the imaging includes performing the imaging with use of the lens that converges excitation light rays exiting the light pipe light exit surface to focus an image of an object defined at an object plane onto an image plane, wherein the object plane is defined at the light pipe light exit surface, and wherein the image plane is defined at the detector surface.

* * * * *